(12) United States Patent
Tonogai

(10) Patent No.: US 6,996,059 B1
(45) Date of Patent: Feb. 7, 2006

(54) INCREASING DURATION OF INFORMATION IN A PACKET TO REDUCE PROCESSING REQUIREMENTS

(75) Inventor: Dale C. Tonogai, Los Altos, CA (US)

(73) Assignee: Shoretel, INC, Sunnyvale, CA (US)

( * ) Notice: Subject to any disclaimer, the term of this patent is extended or adjusted under 35 U.S.C. 154(b) by 0 days.

(21) Appl. No.: 09/314,593

(22) Filed: May 19, 1999

(51) Int. Cl.
*H04L 12/56* (2006.01)
(52) U.S. Cl. .................. 370/230; 370/389; 370/466
(58) Field of Classification Search ................ 370/389, 370/395.63, 466, 230
See application file for complete search history.

(56) References Cited

U.S. PATENT DOCUMENTS

| | | | |
|---|---|---|---|
| 4,771,391 A * | 9/1988 | Blasbalg | |
| 5,148,429 A * | 9/1992 | Kudo et al. | |
| 5,315,591 A * | 5/1994 | Brent et al. | |
| 5,384,770 A * | 1/1995 | Mays et al. | |
| 5,541,919 A * | 7/1996 | Yong et al. | |
| 5,734,654 A * | 3/1998 | Shirai et al. | 370/396 |
| 6,003,089 A * | 12/1999 | Shaffer et al. | 709/233 |
| 6,088,364 A * | 7/2000 | Tokuhiro | 370/466 |
| 6,161,123 A * | 12/2000 | Renouard et al. | |
| 6,279,052 B1 * | 8/2001 | Upadrastra | 710/22 |
| 6,333,950 B1 * | 12/2001 | Karasawa | 375/240.23 |
| 6,421,720 B2 * | 7/2002 | Fitzgerald | 709/224 |
| 6,594,699 B1 * | 7/2003 | Sahai et al. | 705/228 |

OTHER PUBLICATIONS

AT&T Definity® Communications System Generic 1 and Generic 3 and System 75, 8410 Voice Terminal User's Guide, Issue 1, Jan. 1994, 10 pp.

Cisco Systems Inc., "System Description for the Cisco Communications System Version 2.1," http://www.selsius.com/literature/sales-literature/systemdescription21.pdf, Jan. 1999, pp. 1-35.

CrystaLAN™ Desktop, Manufacturer's Part No. 40001-10, Shoreline Teleworks, Inc., 1998, 2 pp.

(Continued)

*Primary Examiner*—Kenneth Vanderpuye
(74) *Attorney, Agent, or Firm*—Silicon Valley Patent Group LLP

(57) ABSTRACT

A device forms packets for a stream of information being transmitted over a packet switched network (such as the Internet) in the normal manner. The device responds to a predetermined event by deliberately forming packets to provide a different quality of service, as compared to the service quality provided by packets that were formed prior to the event. The predetermined event can be related to deterioration or improvement in network performance, and the device can respond by correspondingly decreasing or increasing the service quality of the packets being formed. Specifically, the predetermined event can indicate an increase in processing requirements beyond a threshold, and the device reduces service quality by including a larger amount of information (also called "payload") in each packet formed after the event, as compared to the amount of information included prior to the event. The predetermined event can be triggered by a change in processing requirements in the device that forms the packets (also called "source device"). Alternatively, when a processing requirement change occurs in another device that is coupled to the source device, the other device can inform the source device. If the other device generates and transmits another stream (also called "return stream") back to the source device, the other device can notify the source device implicitly, by simply using a changed payload size in packets that form the return stream.

31 Claims, 21 Drawing Sheets

OTHER PUBLICATIONS

CrystaLAN™ IPBX™, Manufacturer's Part No. 10012-10, Shoreline Teleworks, Inc., 1998, 2 pp.

CrystaLAN™ Server, Manufacturer's Part No. 20001-10, Shoreline Teleworks, Inc., 1998, 2 pp.

CrystaLAN™ Voice Services, Shoreline Teleworks, Inc., 1998, 2 pp.

DataBeam Corporation, "A Primer on the H.323 Series Standard," http://www.databeam.com/pdffiles/h323.primer-v2.pdf, updated May 1998, pp. 1-16.

Lawrence Berkeley National Laboratory, "vat—LBNL Audio Conferencing Tool," file://D:\vat\vat-4.Ob2\html\vat.html, May 13, 1999, 5 pp.

Lucent Technologies Inc., "Impact and Performance of Lucent's Internet Telephony Server (ITS) over IP Networks," 1997, pp. 1-16.

Lucent Technologies Inc., "Internet Telephony Server—E," http://www.lucent.com/enterprise/internet/its-e/how_its_works.html, May 15, 1999, 3 pp.

Lucent Technologies Inc., "Internet Telephony Server—Enterprise(ITS-E)," http://www.lucent.com/dns/products/its_e_g.html, May 15, 1999, 15 pp.

Lucent Technologies Inc., "Internet Telephony Server-Enterprise," Apr. 1998, 4 pp.

Lucent Technologies Inc., "PacketStar™ IP Gateway 1000," http://www.lucent.com/dns/products/gw1000_b.html, May 15, 1999, 2 pp.

Lucent Technologies Inc., "The PacketStar™ IP Gateway 1000," 1999, 4 pp.

Margulies, E., *The UnPBX*, Flatiron Publishing, Inc., New York, Jul. 1997, Chapter 7, pp. 7-16 through 7-22.

*McGraw-Hill Encyclopedia of Science & Technology*, 8th Ed., 1997, vol. 14, pp. 393-395.

*McGraw-Hill Encyclopedia of Science & Technology*, 8th Ed., 1997, vol. 18, pp. 188-198.

MICOM Communications Corp., "Voice/Fax Over IP: Internet, Intranet, and Extranet," http://www.micom.com/whitepapers/whtpaper.pdf., believed to be 1998 or earlier, pp. 1-47.

Natural Microsystems, "IP Telephony and the Fusion Gateway Platform," http://www.nmss.com/nmss/nmsweb.nsf/tech/fusionwp, updated Sep. 1998, pp. 1-13.

NEC NEAX 2000 IVS System Feature Definitions, date believed to be prior to 1998, 17 pp.

Netrix Corporation, "Free Voice. Your Choice. A Guide to Voice over Data Options.", http://www.netrix.com/products/wpprs/voip/voipwp.htm, updated Mar. 1, 1999, 7 pp.

Network Research Group of Lawrence Berkeley National Laboratory, http://www-nrg.ee.lbl.gov/vat, May 1992, modified May 1996, 555 pp.

Schulzrinne, H., "Voice Communication Across the Internet: A Network Voice Terminal," Dept. of Electrical and Computer Engineering, Dept. of Computer Science, University of Massachusetts, Amherst, MA 01003, Jul. 29, 1992, pp. 1-34.

Schulzrinne, H., et al., "RTP: A Transport Protocol for Real-Time Applications," IETF Audio/Video Transport Working Group, Jan. 1996, pp. 1-75.

Sulkin, A., "Definity® ProLogix™ Solutions," Lucent Technologies, Inc., 1997, 10 pp.

TouchWave WebSwitch 1000 Introducing The WebSwitch 2000 Series of Modular IPBXs with Integrated IP Telephony, TouchWave, Inc, 994 San Antonio Road, Palo Alto, CA 94303, 1998, 3 pp.

* cited by examiner

INCREASING DURATION OF INFORMATION IN A PACKET TO REDUCE PROCESSING REQUIREMENTS

CROSS REFERENCE TO ATTACHED APPENDICES

Appendix A, which is part of the present disclosure, is included in a microfiche appendix consisting of 2 sheets of microfiche having a total of 160 frames, and the microfiche appendix is incorporated herein by reference in its entirety. Microfiche Appendix A is a listing of source code in the language C for implementing a send module, a receive module, a play module and a command module, for use with one illustrative implementation of this invention as described more completely below.

Appendix B, which is also part of the present disclosure, is a paper appendix located in pages 24–34 below, and is also incorporated herein by reference in its entirety. Appendix B is a listing of source code in the language C for implementing another receive module, for use with another illustrative implementation of this invention as described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

A PBX provides interconnections among internal telephone lines that are connected to telephone instruments at a single facility (such as a law office). The PBX also interconnects the internal telephone lines to a smaller number of external telephone lines (also called "trunks") of a telephone company. Such PBXs provide a number of features of the type described in, for example, "DEFINITY Communications System, Generic 1 and Generic 3 and System 75, 8410 Voice Terminal User's Guide," pages 5–8, 1994, published by AT&T GBCS Documentation Development, Middletown, N.J., 07748-1998.

There is a growing trend towards audio communications taking place over packet-switched networks, such as the Internet, instead of directly on the telephone network (that provides only circuit switching and is sometimes called "public switched telephone network(PSTN)"). Such audio communications can be facilitated by various types of devices such as: (1) specialized PBXs (also called "packet-switching PBXs") that directly connect to packet-switched networks, (2) gateways that connect circuit-switching devices to packet-switched networks and (3) software tools that connect personal computers to packet-switched networks. One example of a packet-switching PBX (FIG. 1) is described in "Intranet and IP-Based UnPBXs," Chapter 7, pages 7–16 to 7–22, in the book entitled "the UnPBX" edited by Edwin Margulies, Flatiron Publishing, Inc. 1997.

In this example, the packet-switching PBX includes one or more telephony switches 1 and 2, each of which has twelve ports that can be connected either to internal telephone lines or to external telephone lines. In addition, each of telephony switches 1 and 2 includes a digital port that is connected to an ethernet 3 for communication therebetween. For example, if telephone instrument 4 needs to be connected to telephone instrument 5, switch 2 routes the call via ethernet 3 to switch 1. Information carried by any call routed over ethernet 3 is chopped up into a number of portions, and each portion is placed in a packet (such as a UDP packet that conforms to the TCP/IP protocol used over the Internet) that is transmitted between switches 1 and 2.

One example of a gateway for circuit-switching PBXs is the ITS-E described in "Products Services & Solutions Internet Telephony Server-E", published November 1997 and available on the Internet at http://www.lucent.com /enterprise/internet/its-e/how_its_works.html. The ITS-E includes a PSTN interface board 11 (FIG. 2) for connection to telephone lines (T1/E1/analog) of a PBX, and a DSP card 12 that performs voice compression and/or fax processing and generates packets, and the packets are sent to an ethernet 13 via an ethernet card 14.

One example of a software tool for use in a personal computer is an audio conferencing tool described in "vat—LBNL Audio Conferencing Tool", published May 1996 and available at http://www-nrg.ee.lbl.gov/vat. The packets generated by this tool conform to the real-time transport protocol (RTP) as described in "RTP: A Transport Protocol for Real-Time Applications", Network Working Group, January 1996, available from http://www.ietf.org/rfc/rfcl889.txt. RTP provides end-to-end network transport functions suitable for applications transmitting real-time data, such as audio, video, or simulation data, over multicast or unicast network services.

Audio communications over packet switched networks have several drawbacks related to quality of service. For example, packet delay (corresponding to the time difference from when a first user begins talking to when a second user hears the first syllable) affects quality, as described in a paper entitled "Impact and Performance of Lucent's Internet Telephony Server (ITS) over IP Networks", November 1997 available from http://www.lucent.com. Packet delay is of two types: a fixed delay that arises from signal processing and propagation and variable delay that results from queuing and processing of the packets.

Moreover, for good quality, the packets must be reassembled in an ordered stream and played out at regular intervals despite varying arrival times. Variation in the arrival of packets results in an effect known as "jitter." Jitter can be handled via a buffer delay that corresponds to the maximum variable delay that is expected.

Another factor that affects service quality is loss of packets. Packet loss can be defined as the percentage of transmission packets from a source audio terminal that do not reach the destination audio terminal. Packet loss can occur due to a number of reasons, including excessive delay and congestion. Excessive delay leads to packet loss if the delay experienced by a packet exceeds the "time-to-live" value of the packet. Moreover, when queues in a router (between the source audio terminal and the destination audio terminal) grow large, the load in the router's central processing unit (CPU) increases. As the queues fill up and congestion increases, a common decongestion method is to drop all the packets in all the queues. Since audio is normally transmitted using UDP packets (that are not retransmitted), such packet loss is perceived as gaps in conversation.

When network performance deteriorates beyond a particular threshold, the above-described paper "Impact and Performance of Lucent's Internet Telephony Server (ITS) over IP Networks" recommends that calls over the packet-switched network be "blocked" or optionally routed over the regular PSTN.

SUMMARY

In accordance with the invention, a device forms packets from a stream of information (such as audio, video, or real-time monitoring and control information) for transmission over a packet switched network. In forming the packets, the device responds to a predetermined event by deliberately changing the quality of service, e.g. by forming packets that provide a different quality of service, as compared to the service quality provided by packets that were formed prior to the event. The predetermined event can be related to deterioration or improvement in system performance (defined to be performance of the device and of the network, as a whole), and the device can respond by correspondingly decreasing or increasing the service quality of the packets being formed. A deliberate reduction of service quality in response to a reduction in system performance as described herein reduces or even eliminates the need for calls to be "blocked" or to be routed over the PSTN.

In one embodiment, the predetermined event indicates an increase in processing requirements beyond a threshold, and the device reduces service quality by including information (also called "payload") of a greater duration in a packet formed after the event, as compared to the duration of information in a packet formed prior to the event. Such an increase in information duration increases the payload size and reduces the rate of packet formation, thereby to reduce processing requirements. However, the larger payload is generated over a larger duration, thus increasing packet delay (that adversely affects service quality as described above). The increased packet delay is more than offset by a reduction in (or even elimination of) packet loss that would otherwise occur when processing requirements increase beyond the threshold.

The predetermined event can be triggered by a change in processing requirements, either in the device that forms the packets (also called "source device"), or in another device (such as a router or a destination device) that handles the packets and that is coupled to the source device. In one implementation, when the processing requirements increase locally within the source device, the source device uses the new payload size only for new streams, so that existing streams are not affected. In an alternative implementation when the processing requirements increase locally within the source device, the change in payload size affects all streams generated by the source device, thereby to change the payload size of each packet formed after the predetermined event. In both implementations, when the processing requirements change in an other device, the change in payload size is limited only to streams being sent to the other device.

When a processing requirement change occurs in an other device, the other device can inform the source device either explicitly or implicitly. In one embodiment, the other device explicitly notifies the source device about the need for a change in payload size via an out of band signal. In another embodiment, the other device explicitly notifies the need for change via one or more bits in the header of each packet. In yet another embodiment, the other device (also called "destination device") generates and transmits another stream (also called "return stream") back to the source device, and implicitly notifies the need for change by simply using a changed payload size in packets that form the return stream. The just-described embodiment is useful when explicit mechanisms are not available for such signaling, but it is necessary for the source device to compare the payload size of packets in the return stream with payload size of packets being formed therein.

In one implementation, each of the source device and the destination device includes a digital signal processor (DSP) that generates the information (called "snippet") for use as payload over a fixed duration (e.g. 5 milliseconds). Initially, when the processing requirements are below threshold, each of the source device and destination device forms packets that contain two snippets. When the processing requirements cross the threshold in the source device, the source device changes the payload size by including four snippets in each packet. In response to the increased payload size, the destination device also includes four snippets in each packet (for the return stream). A similar increase in payload sizes occurs when the processing requirements cross threshold in the destination device (except that the destination devices changes payload size first). Note that instead of changing the payload size, the snippet size can be changed.

In this implementation, each of the source device and the destination device maintain a buffer (hereinafter "jitter buffer") that temporarily holds snippets from one or more packets before the information contained therein is played. The jitter buffer is used to average out variations in inter-arrival duration (the duration between arrival of two packets), so that snippets are played at a uniform rate (that is same as the rate at which snippets are generated). The source and destination devices maintain the size of their respective jitter buffers within a range defined by a maximum size and a minimum size by (1) adding two copies of a snippet to the jitter buffer if a current size of the jitter buffer is smaller than a minimum size (2) dropping a snippet if the current size of the jitter buffer is larger than a maximum size, and (3) simply adding the snippet to the jitter buffer if the current size of the jitter buffer is between maximum size and minimum size. A jitter buffer, when sufficiently large, minimizes the effects of changing payload size as described herein.

DETAILED DESCRIPTION

Figure 1:
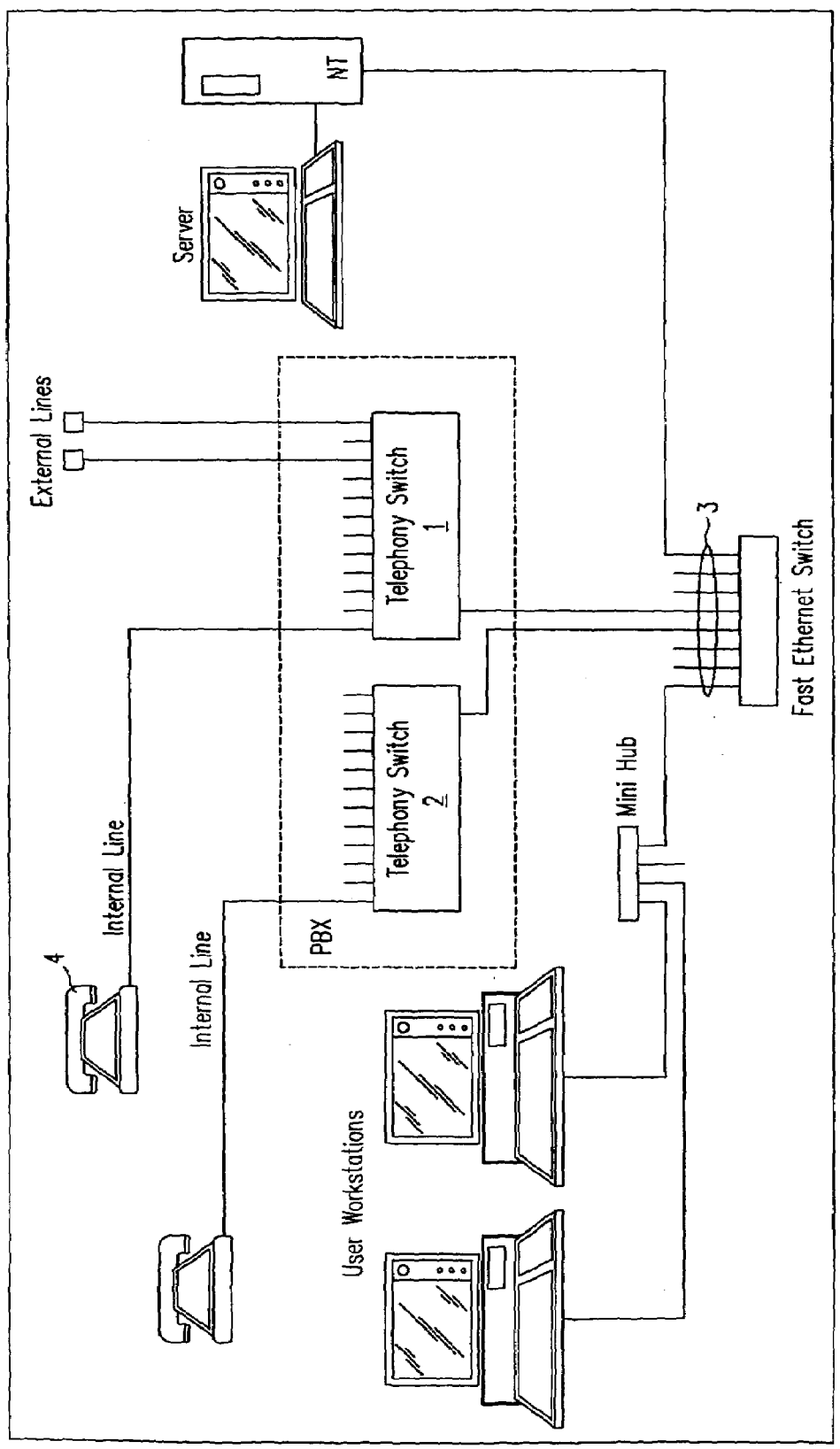
FIG. 1 illustrates, in a high-level block diagram, a packet-switching PBX of the prior art.
Figure 2:
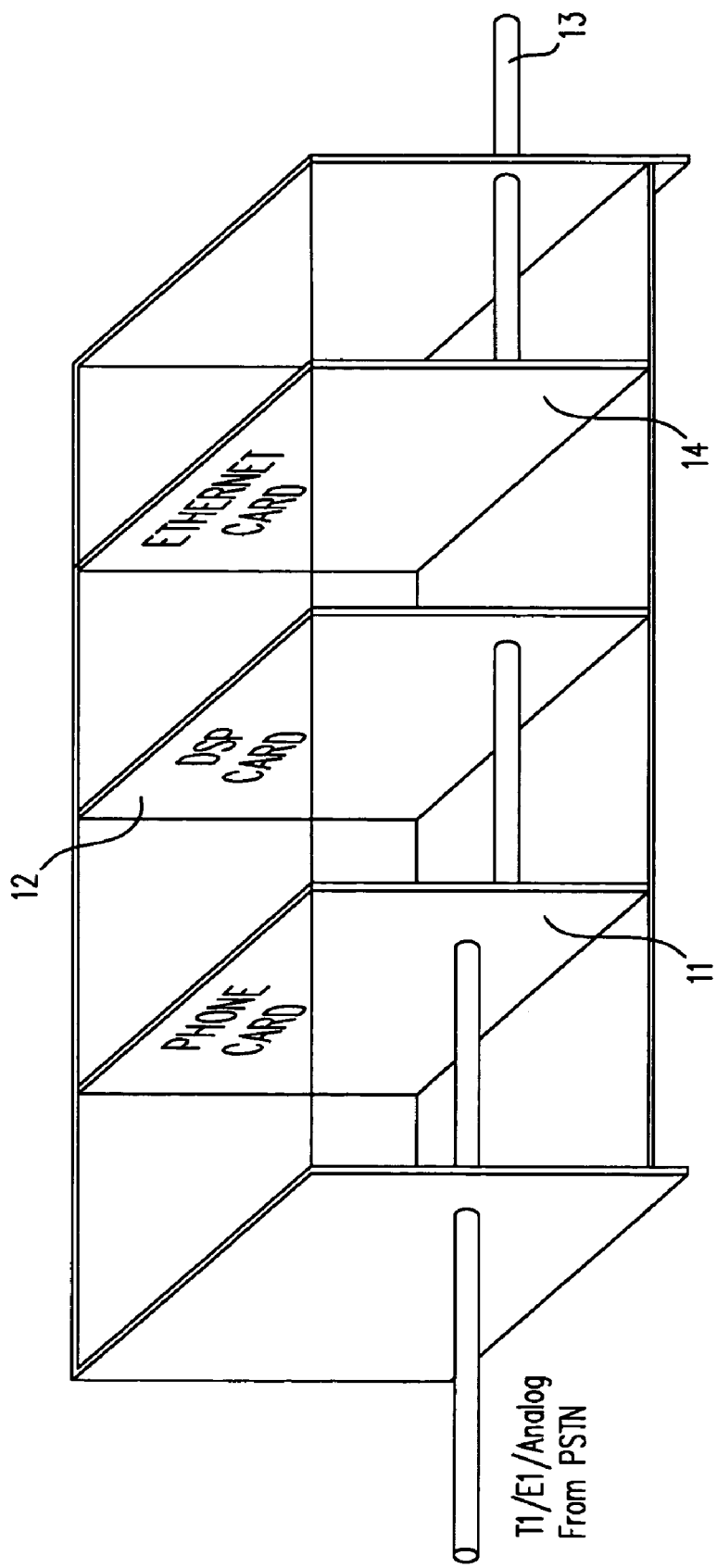
FIG. 2 illustrates, in a three-dimensional cut-away view, the cards included in a gateway of the prior art.
Figure 3:
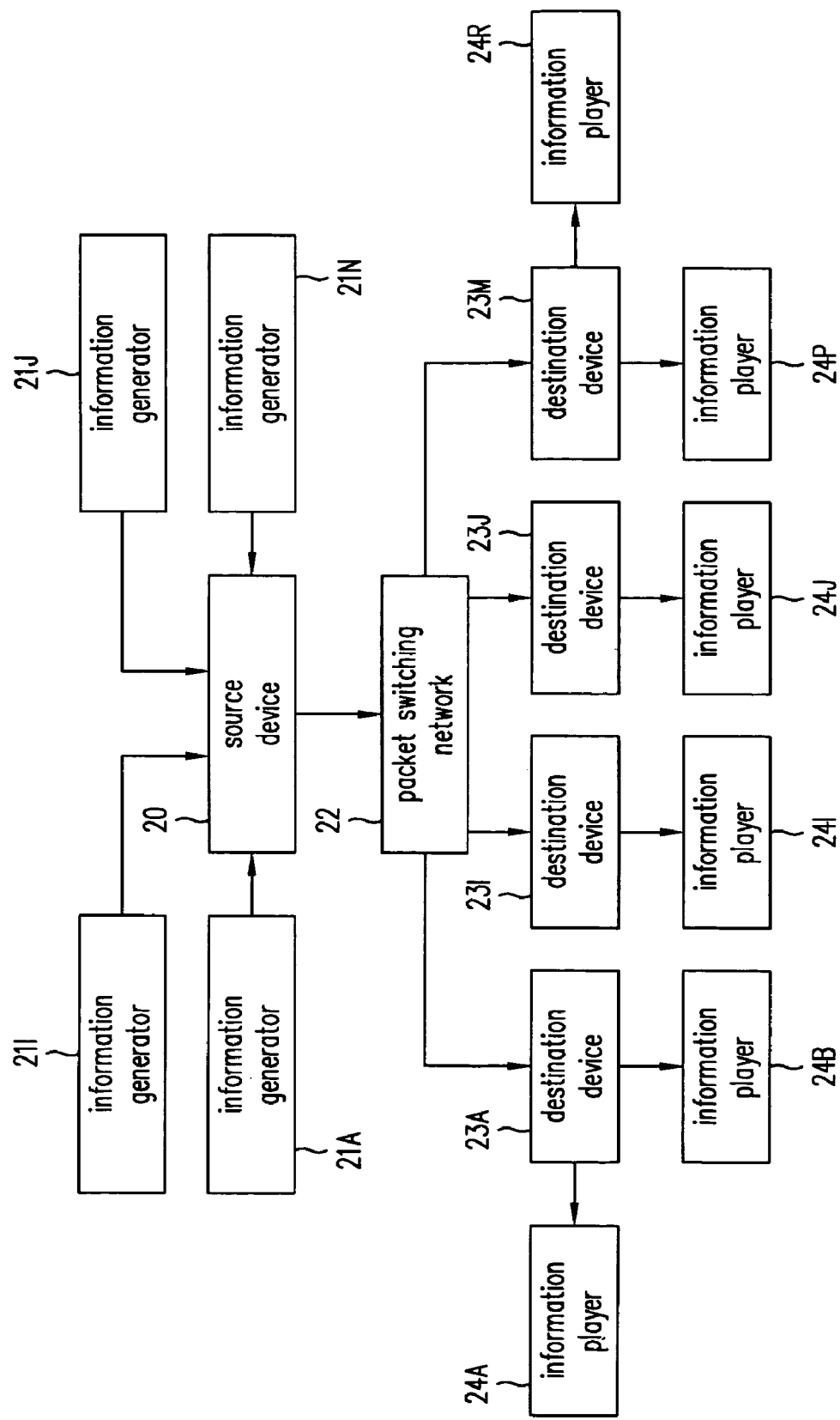
FIGS. 3 and 6 illustrate, in high-level block diagrams, a source device that changes the duration of information sent to different destination devices in two embodiments of the invention.

In accordance with the invention, a device 20 (FIG. 3) receives information in a continuous form (also called "stream(s)") from one or more information generators 21A–21N (wherein $A \leq I \leq N$, N being the total number of information generators connected to device 20), and forms a number of packets for carrying the information over a packet switched network 22. Network 22 transmits the packets to one or more of destination devices 23A–23M (wherein $A \leq I \leq J \leq M$, M being the total number of destination devices that receive the packets). Devices 23A–23M retrieve information from the received packets and pass the information in a continuous manner to information players 24A–24R connected thereto.

Network 22 can be any network that receives, routes and transmits information in discrete chunks (rather than in a continuous form), such as Ethernet, X.25 network, Internet or some combination thereof. The information being transferred can be any of audio, video, or real-time monitoring and control signals. If the information is audio signals, then examples of an information generator 21I and an information player 24I are telephone instruments; in case of video signals, an example of information generator 21N is a video camera, and an example of information player 24B is a television; in case of real-time monitoring signal, an example of information generator 21A is a temperature sensor (that may be located in an industrial furnace for example) and an example of information player 24P is the screen of a computer monitor (that visually displays the temperature in a graph).

In accordance with this invention, device 20 responds to one or more predetermined events by deliberately forming one or more packets that provide a different quality of service, as compared to the service quality provided by packets that were formed prior to the event. In one embodiment, the predetermined event is related to deterioration in performance of source device 20, and device 20 responds by correspondingly decreasing the service quality of packets formed thereafter. Specifically, device 20 decreases service quality by increasing the duration of the information being transmitted in each packet.

The information duration is the length of time needed to play out the information in real time; not the actual number of bytes. The number of bytes of the information being transmitted per unit time is dependent on the codec being employed, but is independent of the payload size.

However, assuming everything else stays the same, an increase in information duration increases the packet size and reduces the rate of packet generation. Moreover, when the packet size is the same, an increase in the number of streams is reflected by a proportional increase in the rate of packet generation and the processing requirements locally within device 20. Therefore, the predetermined event can be related to the number of streams being generated by device 20, e.g. the event occurs when the number of streams is greater than or equal to a predetermined number (e.g. number I). Instead of the number of streams, other indicators of processing requirements (e.g. number of page faults) can also be used in accordance with the invention. In one example, the number of three-way conference calls being formed by the streams is used to trigger the predetermined event.

In one example, device 20 initially transmits packets for a new stream using a first payload size. As additional streams are created and processing requirements increase, device 20 increases the payload size, e.g. to a second payload size. The effect is that under normal circumstances, device 20 transmits packets of the first payload size. Only as device 20 becomes increasingly loaded will the second (or even larger) payload size have to be used. In applications where two-way communications are involved, if device 20 receives a second (or even larger) payload size, device 20 can respond by also transmitting packets of the received payload size. Such behavior by device 20 further reduces the processing requirements on the remote device that transmitted the packet. So, device 20 transmits streams with low latency initially, and as processing requirements increase, device 20 increases latency, while still allowing a relatively large number of streams to be created and transmitted. Therefore, device 20 provides a graceful transition from a high quality, low latency system when the number of streams is relatively low to a low quality, high latency system when the number of streams is relatively high.

In one embodiment, device 20 initially performs methods 25A–25I (FIG. 4) to set up I streams, and the predetermined event occurs after the Ith stream is set up. Thereafter, device 20 performs methods 25J–25N to set up additional streams, wherein packets for the additional streams have information of a larger duration. Specifically, in method 25A, device 20 initializes (see act 26A in FIG. 4) one or more storage locations to be used in handling the new information stream. Next, device 20 determines (see act 27A) the duration to be used and the payload size based on the processing requirements. As there are no other streams being handled, device 20 uses a default value for the duration (e.g. 5 milliseconds) that is predetermined to provide a highest desired quality of service. Device 20 also determines the payload size to be the size required to hold sufficient information for this duration (either by computation or as a default value).

There are advantages to minimizing the duration (and hence payload size) in each packet. Specifically, a smaller payload size results in reduced end-to-end latency because a system has to wait less time before transmitting each packet. Reduced latency can, in turn, result in better quality of service as perceived by a human user. In addition, if a packet is lost, a smaller payload size means that less information is lost. One of the disadvantages of using a smaller payload size is that rate of packet generation per unit time is larger as compared to the rate for larger payload size. The larger rate can have an adverse effect on the performance of the system, as the network and devices connected to the network spend more time processing packets. Hence, the capacity of the system, in terms of the total number of independent streams that can be handled, is reduced as the payload size is reduced.

After information generator 21I generates information (as illustrated by act 28A) in a continuous manner over the selected duration (also called "first duration"), device 20 forms a packet using the generated information (as illustrated by act 29A). Note that information generator 21I and device 20 operate simultaneously if implemented in different devices (and alternatively operate contemporaneously—i.e. in approximately the same time frame—if implemented by software in a single processor). After each successive first duration (during which generator 21I generates the information), device 20 forms a packet, thereby to generate packets at a uniform rate (that is inverse of the first duration). In a similar manner, device 20 may set up a number I of such streams, so that method 25I requires the same steps as method 25A.

Figure 4:
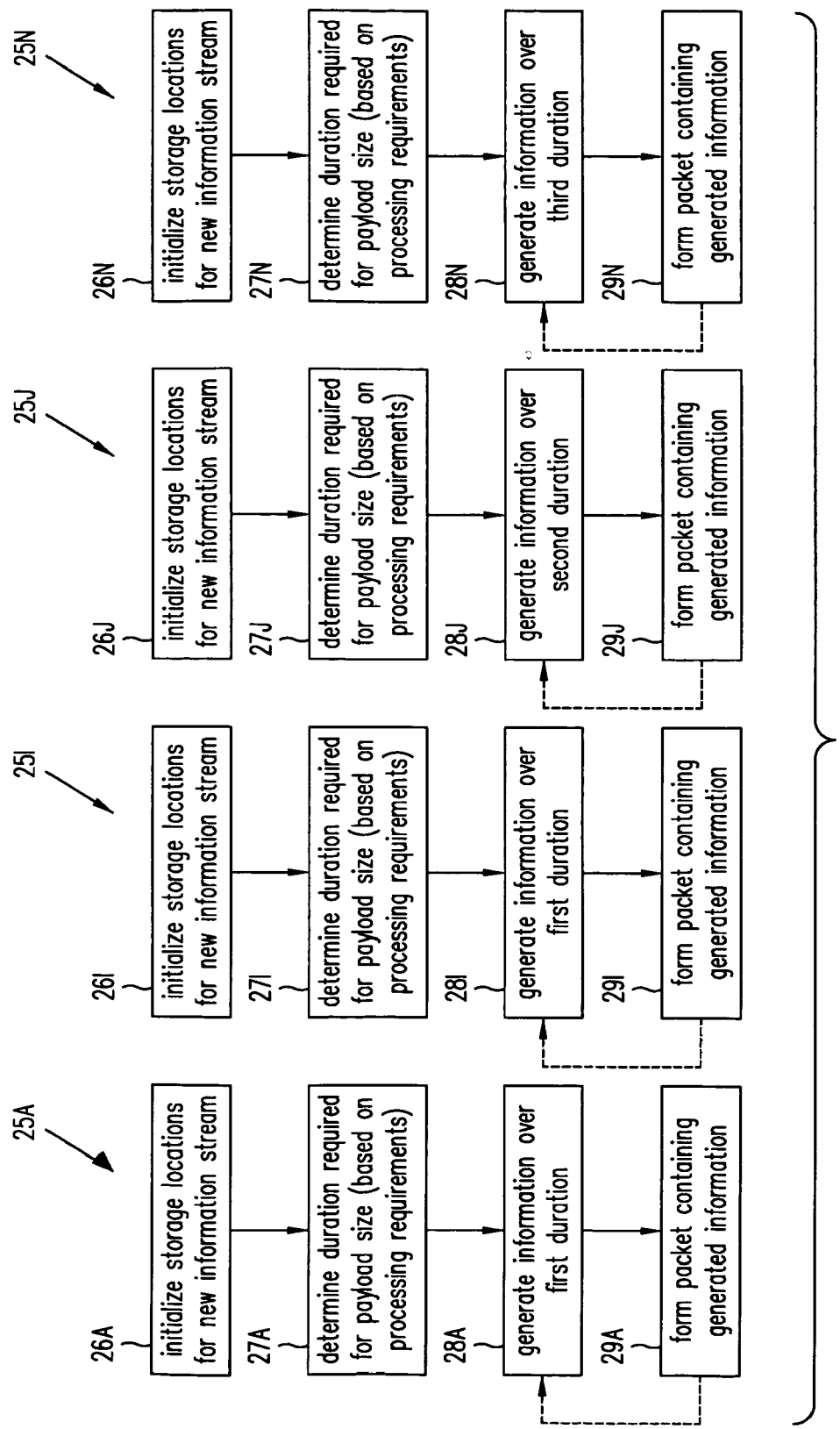
FIGS. 4 and 5 illustrate, in high-level flow charts, the acts performed by the respective source devices of FIGS. 3 and 6 in transferring information to the various destination devices.

After setting up the Ith stream, the predetermined event occurs, and as illustrated in FIG. 4, device 20 performs a method 25J that differs from method 25I only in the duration being selected. Specifically, in act 28J, device 20 allows information generator 21J to generate information for a second duration that is longer than the first duration. Thereafter, one or more additional predetermined events may occur as additional streams are set up, so that in method 25N, information generator 21N is allowed to generate information for a third duration (see act 28N) prior to formation of a packet (in act 29N), wherein the third duration is greater than the second duration. In one example, only two durations are used: a first duration of 10 milliseconds and a second duration of 20 milliseconds, and a single predetermined event causes a switchover from use of first duration to use of second duration in generating packets. In this example, as the payload size is doubled, the rate of packet generation for streams set up after the predetermined event is half the rate for streams set up prior to the event.

Note that in the embodiment illustrated in FIG. 4, for streams (also called "old streams") that were set up prior to the predetermined event, the first duration continues to be used to form packets even after the predetermined event, because the acts of duration determination (e.g. acts 27A–27N) are each performed only once, when the respective stream is set up. Therefore, although processing requirements for each stream (also called "new stream") being set up after the predetermined event have been reduced, old streams continue to require the original processing requirements. Processing requirements for such old streams can also be reduced, by simply moving the duration determination steps into the loop used for the repeated formation of packets, as described next.

Figure 5:
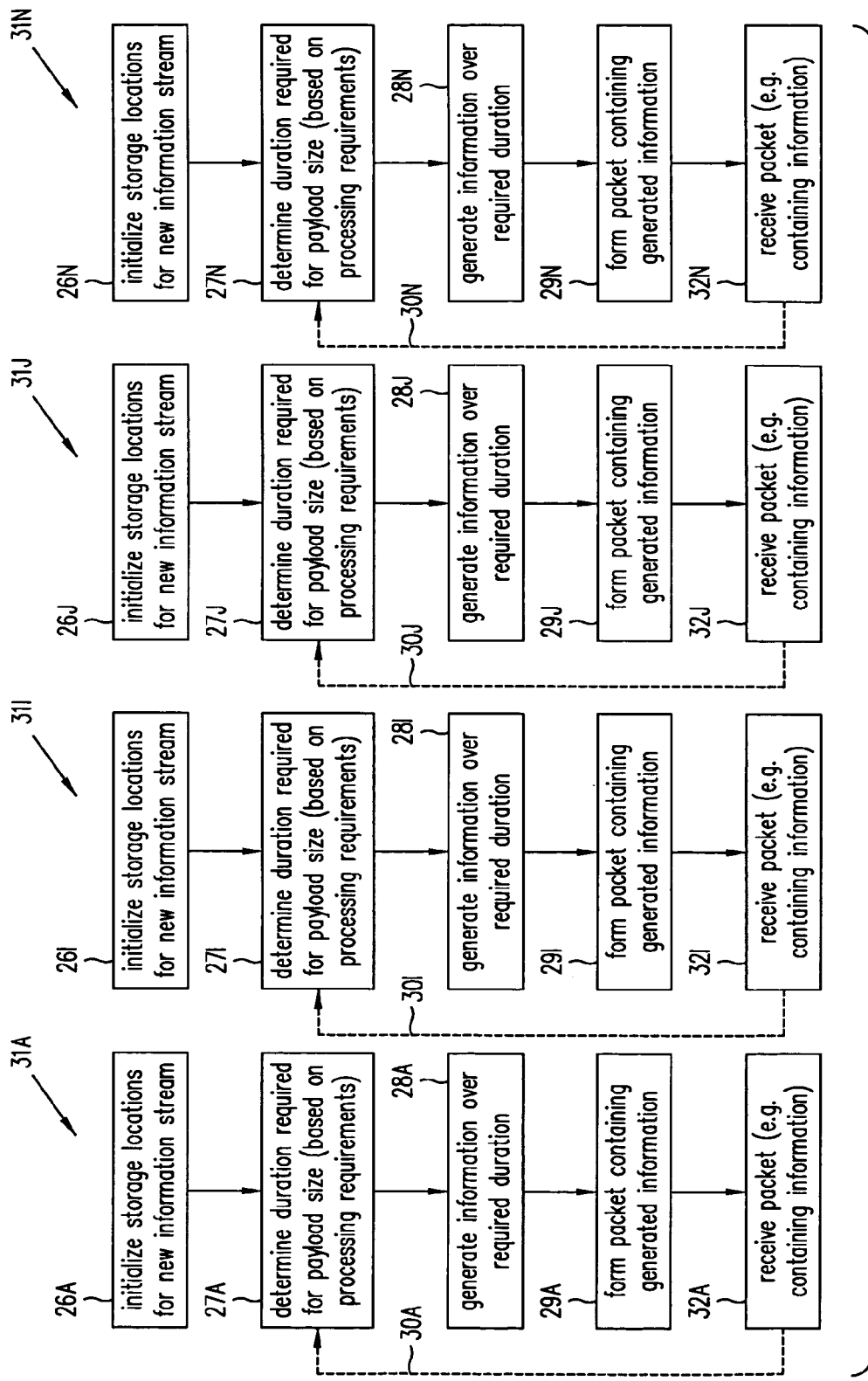
Figure 6:
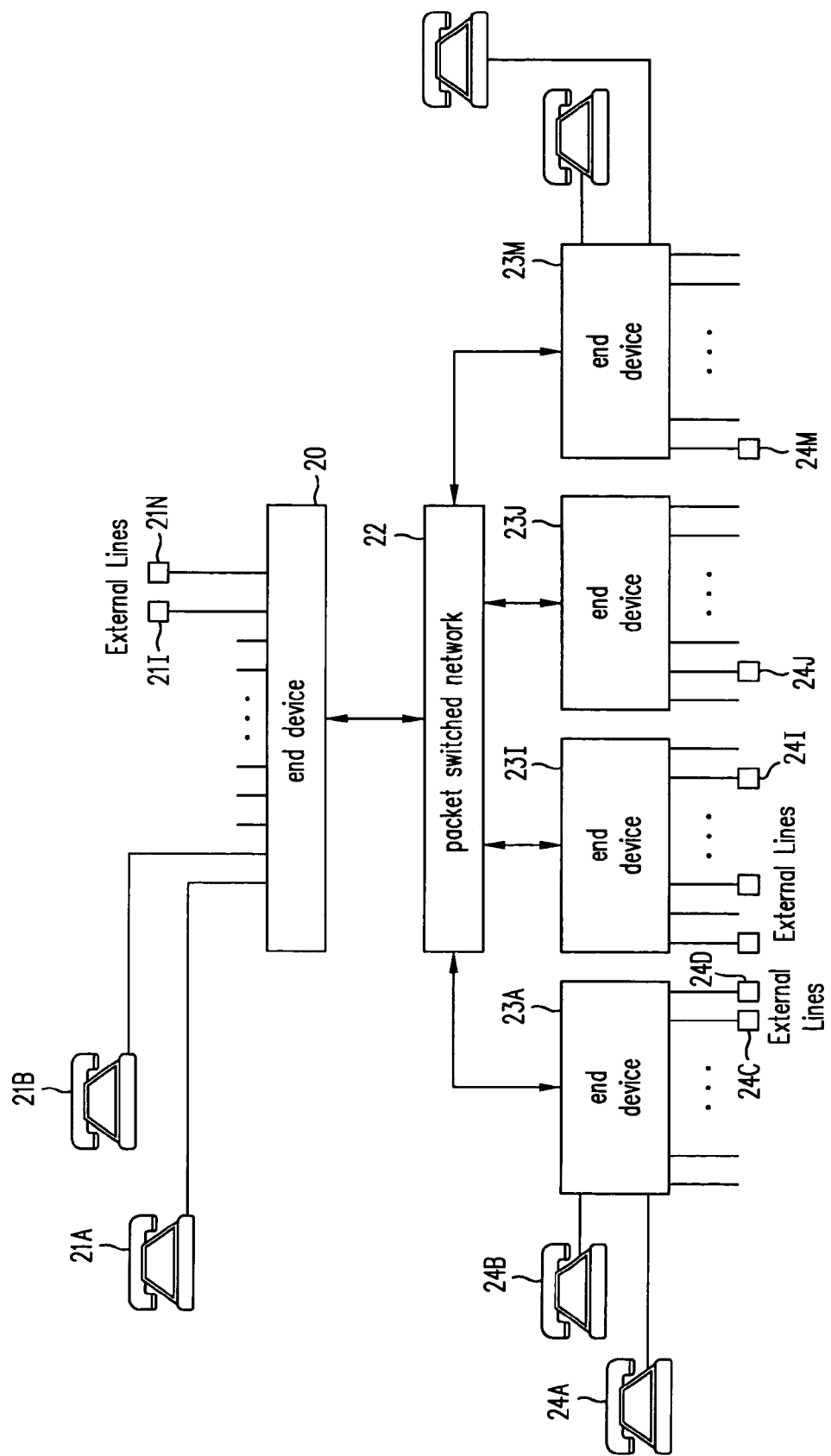

Specifically, in another embodiment, the act of duration determination is performed repeatedly when forming each packet (e.g. before forming as illustrated by branch 30A returning to act 27A in FIG. 5; note that identical reference numerals are used in FIGS. 4 and 5 for similar or identical acts). Note that methods 31A–31N differ from the respective methods 25A–25N in another respect: performance of acts 32A–32N to receive a packet back from one of destination devices 23A–23M. Therefore, device 20 receives as well as transmits packets in this embodiment, thereby to provide support for bidirectional calls, e.g. between telephone instruments as illustrated in FIG. 6. For this reason, each of devices 20 and 23A–23M is labeled in FIG. 6 as an "end device" (as it can both receive and transmit packets).

Note that end device 20 of this embodiment (FIG. 6) provides an interface (for telephone instruments 21A and 21B, and for lines 21I–21N) that conforms to the normal standards for telephony equipment as described in, for example, a document entitled "Bellcore Notes on the Networks," Special Report SR-227, Issue 3, December 1997, available from Direct Sales, Telcordia Technologies, Inc., 8 Corporate Place, PYA 3A-184, Piscataway, N.J. 08854-4156, USA, Phone 1-800-521-2673, and on the web at http://telecom-info.telcordia.com/. See also the document entitled "Network-to-Customer Installation Interfaces—Direct-Inward-Dialing Analog Voicegrade Switched Access Using Loop Reverse-Battery Signaling," available as document number T1.405-1996 from American National Standards Institute (ANSI), 11 West 42nd Street, New York, N.Y., 10036. See also another document entitled "Interface Between Carriers and Customer Installations—Analog Voicegrade Switched Access Lines Using Loop-Start and Ground-Start Signaling" available as document number T1.403-1993 from ANSI as described above.

In this embodiment, end device 20 communicates with packet switched network 22 in accordance with the following ITU-T standards described on the Web at http://www.itu.ch/publications and available from International Telecommunication Union, Sales and Marketing Service, Place des Nations, CH-1211 Geneva 20, Switzerland, Phone 41-22-730-61-41, namely G.711 version 11/1988, G.723.1 Version 3/1996, G.723.1 An. A Version 11/1996, G.723.1 An. B Version 11/1996, G.723.1 An. C Version 11/1996, G.729 Version 3/1996, G.729 Annex A Version 11/1996, G.729 Annex B Version 10/1996, G.729 Annex C Version 9/1998, G.729 Annex D Version 9/1998, G.729 Annex E, Version 9, 1998, H.450.3 Version 2/1998, H.323 Version 2/1998, H.323 Annex D Version 9/1998, H.235 Version 2/1998, H.450.1 Version 2/1998, H.450.2 Version 2/1998 and H.332 Version 9/1998.

Figure 7:
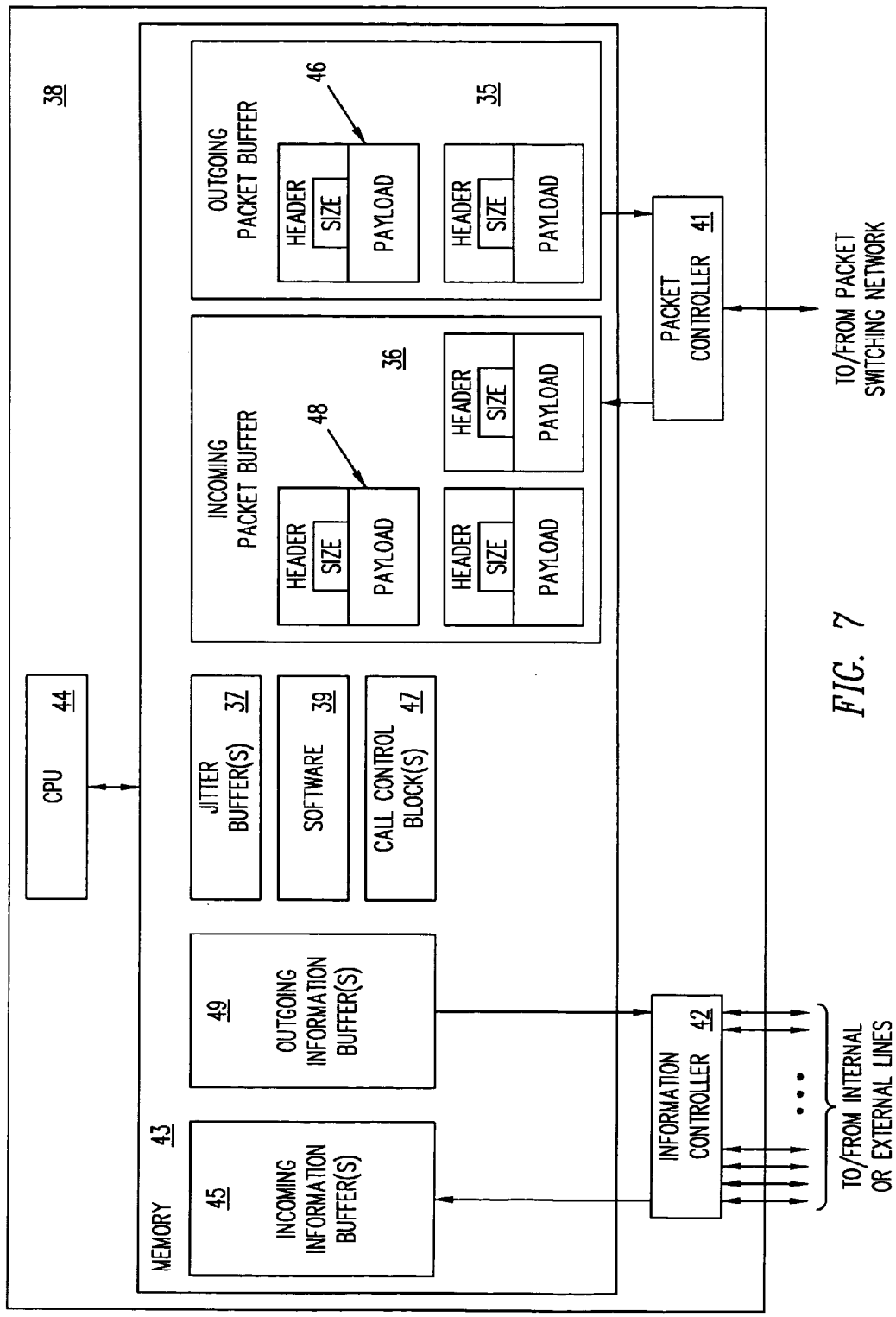
FIG. 7 illustrates, in an intermediate-level block diagram, a CPU, a memory, an information controller and a packet controller included in a source device of the type illustrated in FIGS. 3 and 6.

In one implementation, an end device 38 includes a packet controller 41 (FIG. 7) that interfaces to packet switching network 22 (FIG. 6), an information controller 42 (FIG. 7) that interfaces to internal or external telephone lines (e.g. to telephone instruments or to trunks), a memory 43 to temporarily hold the information and the packets being received and transmitted. End device 38 also includes a CPU 44 that is programmed with computer instructions in software 39 to form packets to be transmitted from the incoming information, and to form outgoing information from the received packets. Specifically, CPU 44 uses incoming information from buffer 45 as payload and forms a packet 46 in outgoing packet buffer 35 by adding a header that is derived from information contained in one or more call control blocks 47. Moreover, CPU 44 strips off a header from a received packet 48 in incoming packet buffer 36 and stores information from the payload in outgoing information buffer 49. CPU 44 may hold one or more copies of the information in an optional jitter buffer 37 for use in the normal manner (e.g. for repeated passage to buffer 49 in case the next packet is unduly delayed).

Figure 8:
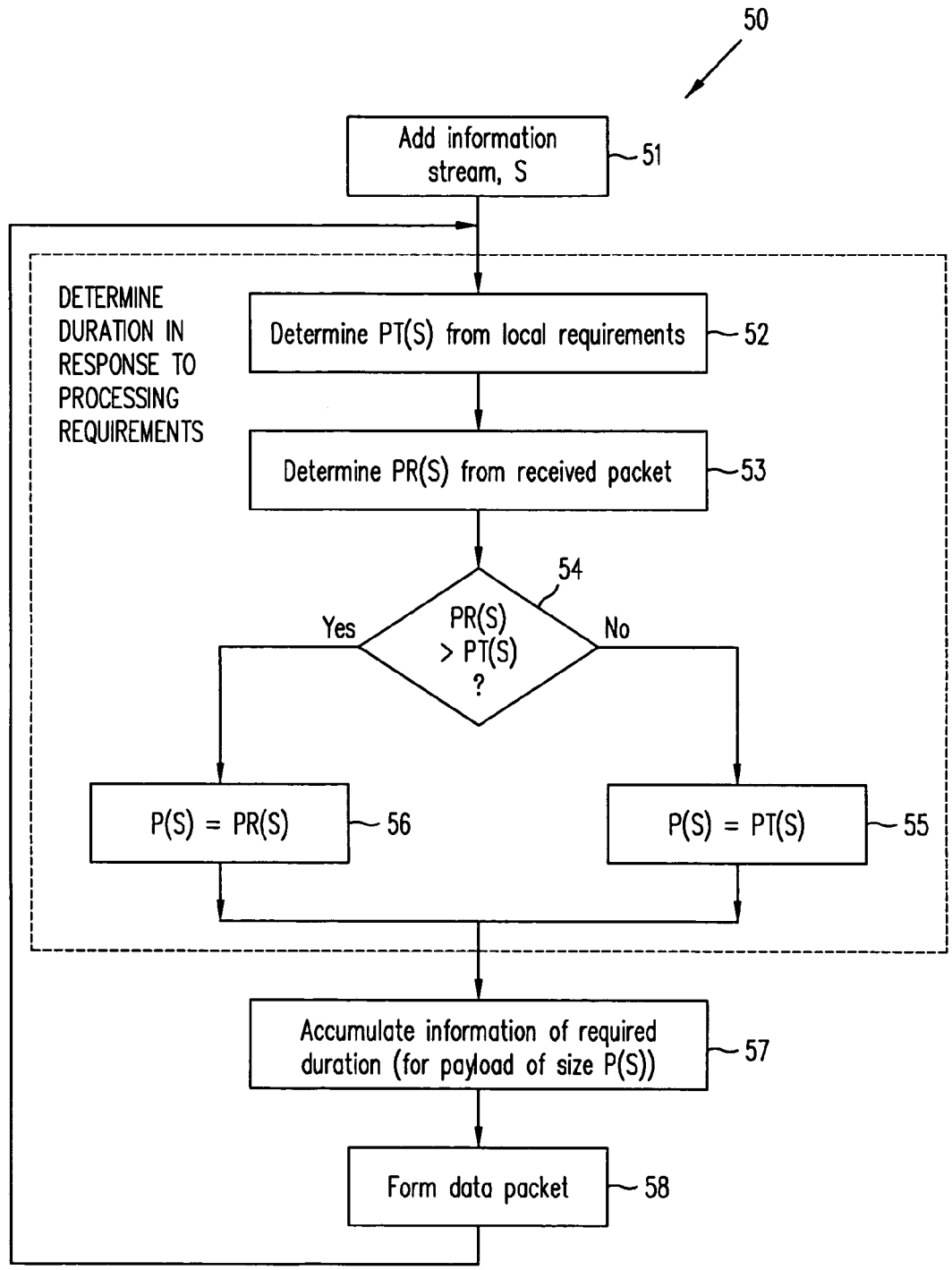
FIGS. 8 and 9 illustrate, in intermediate-level flow charts, acts performed by the CPU of FIG. 7 in two alternative embodiments of the invention.

Note that end device 38 of this implementation can be any type of end device, such as a PBX, a gateway or a conferencing tool. End device 38 implements a change in information duration in accordance with the invention by performing a method 50 (FIG. 8). Specifically, in method 50, CPU 44 adds an information stream (in act 51) by initializing the appropriate storage locations in memory 43 (e.g. for a call control block 47). Thereafter, CPU 44 determines the information duration to be used in forming packets by performing acts 52–56.

Specifically, in act 52, CPU 44 determines a desired payload size PT(S) to be used for packets being transmitted, by use of processing requirements (also called "local requirements") within end device 38 according to a function f. In one such implementation, function f is a step function that has a first predetermined value prior to a first predetermined event, a second predetermined value prior to a second predetermined event, and so on (wherein each successive event indicates increased processing requirements as compared to the prior event). For example, f could be derived from the current number of audio streams, the current amount of CPU activity, the current number of page faults or some combination thereof.

Next, in act 53, CPU 44 determines a payload size PR(S) that the other device wants CPU 44 to use for the current stream (defaults to PT(S) when no packet has been received). Any device that transmits a packet back to CPU 44 can communicate the value of PR(S) to CPU 44 either explicitly or implicitly. To inform CPU 44 of PR(S) explicitly, such a remote device can either encode the value in predetermined field in the header of a packet of information being sent back, or in an out-of-band message (such as a control, status or network management message) that does not carry any portion of the information stream. In another embodiment, neither a field nor an out-of-band message is available, and CPU 44 determines PR(S) to be same as the payload size of the packet received from the remote device.

Figure 9:
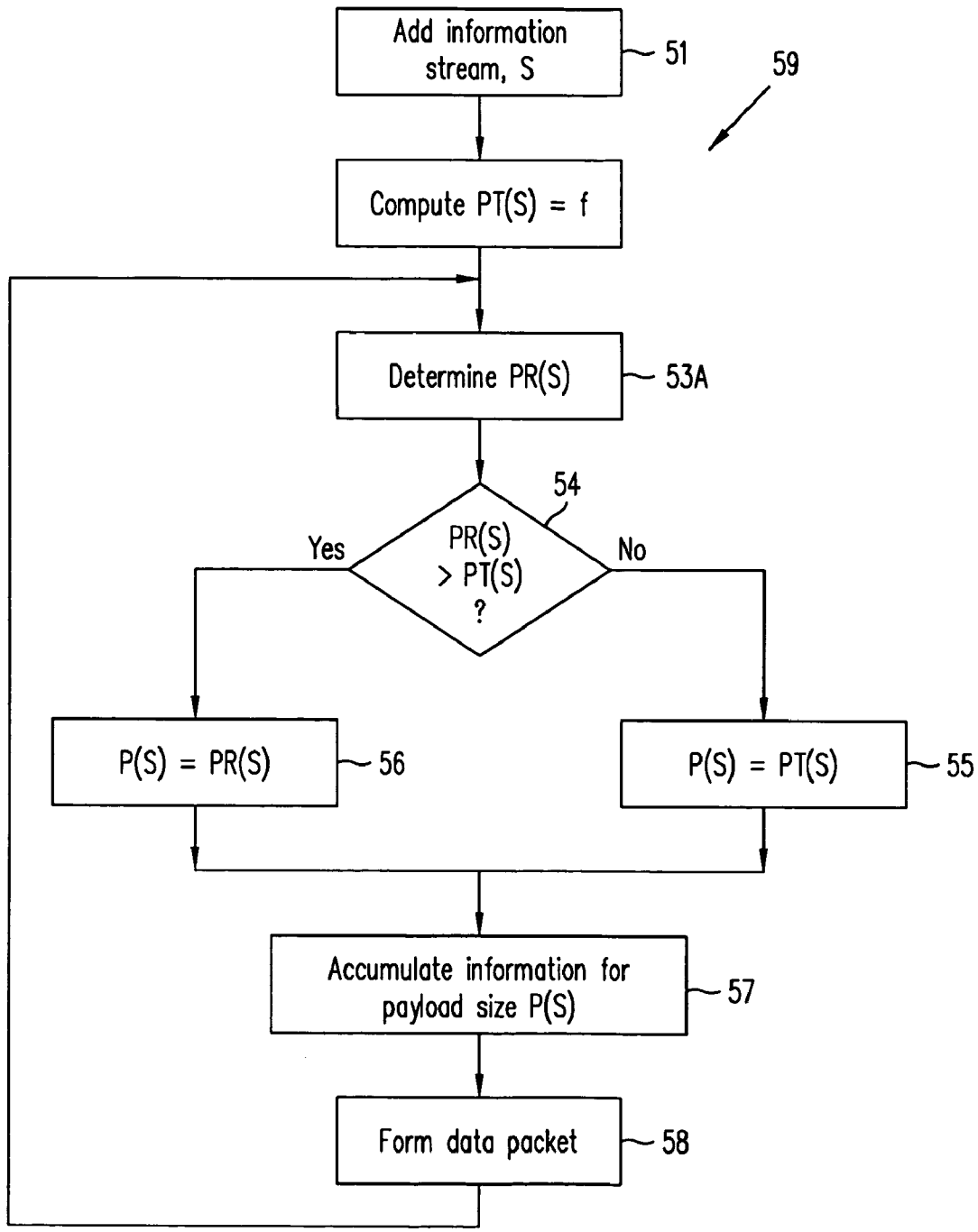

Thereafter, CPU 44 checks (in act 54) if PR(S) is greater than PT(S), and if so sets (in act 56) the payload size for the next packet P(S) to be equal to the received packet's payload size PR(S) and otherwise sets (in act 55) P(S) to be equal to the desired payload size PT(S). Thereafter, CPU 44 accumulates (in act 57) information for a payload of size P(S) for an appropriate duration (based on the rate of information generation). Specifically, CPU 44 simply waits for information controller 42 to write information into incoming information buffer 45 for the appropriate duration. When information of size P(S) has been accumulated (in buffer 45), CPU 44 forms a data packet (in act 58) for transmission of the accumulated information, and returns to act 52 (described above). In an alternative embodiment, CPU 44 performs (as illustrated by method 59 in FIG. 9) several of the same acts 51 and 54–58 as described above (but does not perform acts 52 and 53 in the manner described in reference to FIG. 8), and after act 58 returns to act 53A (instead of act 52).

In one implementation, the above-described end device 38 (FIG. 7) performs various functions of a PBX 60 (FIG. 10) as described in, for example, a document entitled "Requirements for Private Branch Exchange (PBX) Switching Equipment (ANSI/TIA/EIA-464-B-96), published Apr. 22, 1996 available from Global Engineering Documents, 15 Inverness Way East, Englewood, Colo. 80112, Phone 1-800-854-7179, and at http://global.ihs.com. In this implementation, examples of various chips used in PBX 60 are described in Table 1 below.

TABLE 1

Figure 10:
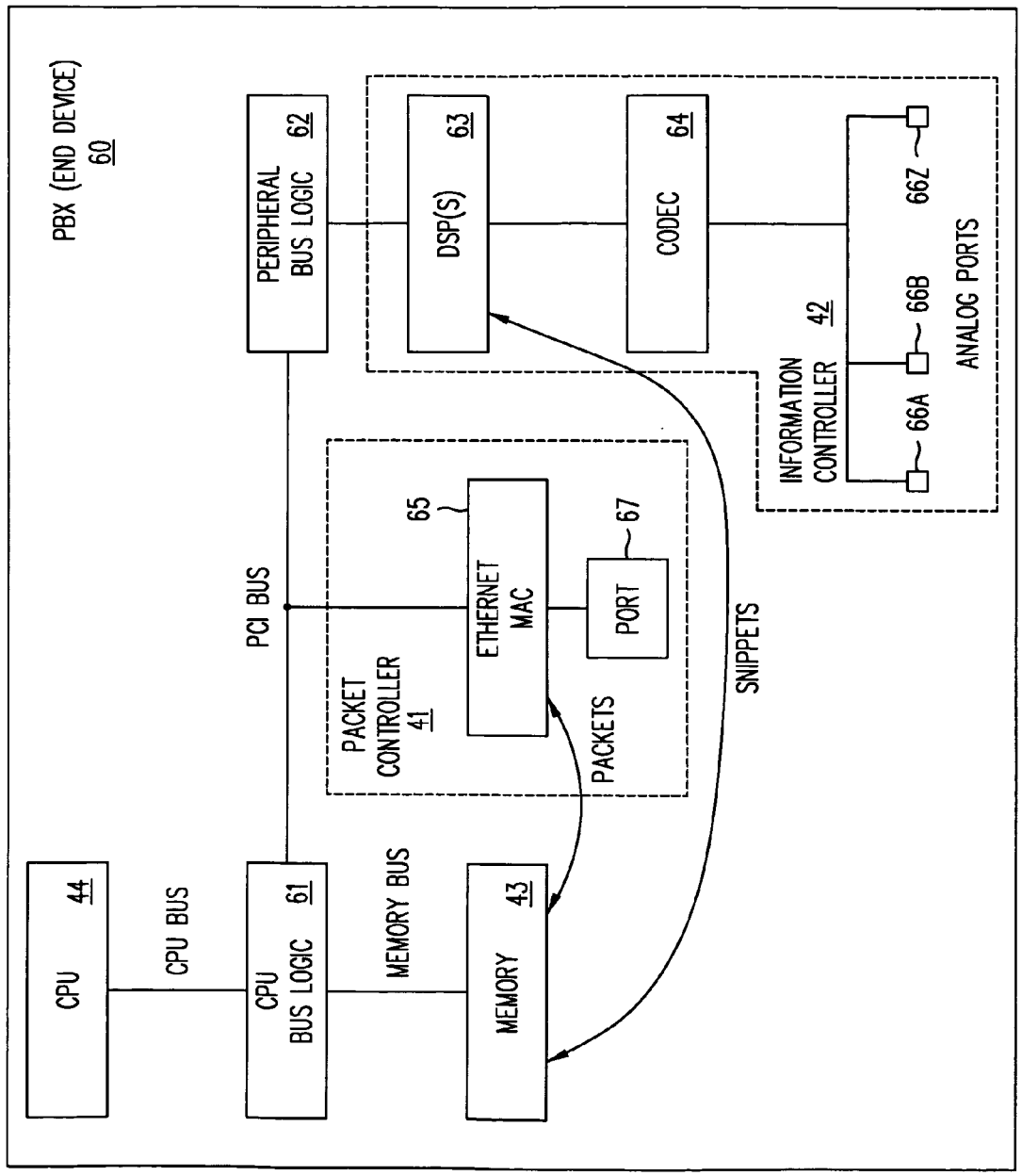
FIG. 10 illustrates, in a low-level block diagram, the source device illustrated in FIG. 7.

| Reference numeral in FIG. 10 | Part Number |
| --- | --- |
| CPU 44 | MIPS R4300 available from NEC and running a real-time operating system called VxWorks available from Wind River Systems |
| CPU Bus Logic 61 (between CPU and memory) | NEC VRC 4371 |
| Peripheral Bus Logic 62 (between logic 61 and information controller 42) | NEC VRC 4372 |
| Ethernet media access controller (MAC) 65 in packet controller 41 | DEC 21143 |
| Port 67 in packet controller 41 | RJ 45 |

TABLE 1-continued

| Reference numeral in FIG. 10 | Part Number |
| --- | --- |
| DSP 63 in information controller 42 | TI TMS 320C57 (two copies used) |
| Codec 64 in information controller 42 | AMD AM79Q021 |
| Memory 43 | DRAM |

PBX 60 of this implementation has analog ports 66A–66Z (e.g. RJ-11 ports, twelve in number), each of which can be connected to a telephone (via an internal telephone line) or to a trunk of a public switched telephone network (via an external telephone line). Codec 64 converts an analog audio signal at ports 66A–66Z to/from a digital format and passes the digital signals to/from DSPs 63. DSPs 63 in turn transfer the digital information in discrete blocks (hereinafter "snippets") to/from memory 43. CPU 44 rearranges information within memory 43 to form packets or to form snippets, and thereby to route the digital information among ports 66A–66Z and 67 in the manner described above. Note that no packets are formed if a call requires information transfer between two or more analog ports 66A–66Z. Instead, snippets are transferred therebetween in the normal manner, although such streams can be included in determining the local processing requirements (as described herein). Port 67 provides an interface to a packet switched network 22 (described above in reference to FIG. 6).

Figure 11:
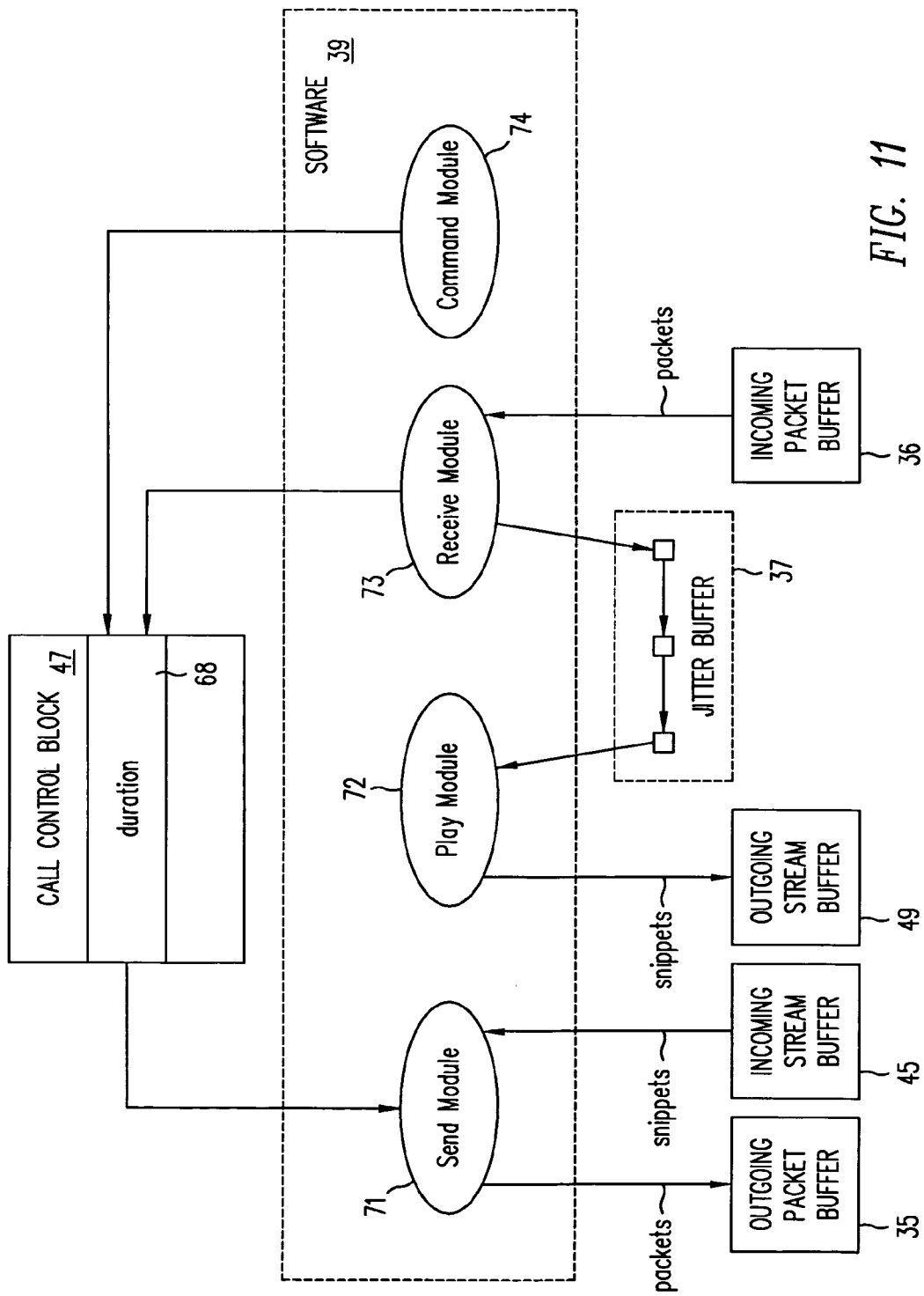
FIG. 11 illustrates, in a block diagram, interaction of the CPU with various buffers in the memory of FIG. 7.

In addition to switching information, PBX 60 provides additional functions typical of a PBX device, e.g. call routing, voice mail, or automated attendant. A call is formed by two or more streams that are described by a call control block 47 (FIG. 11) normally held in memory 43 (FIG. 10). Block 47 (FIG. 11) has a variable (called "duration") 68 that indicates the duration of information to be used for all packets (incoming and outgoing) within this call. One example of call control block 47 is a media session control block (MSCB) defined in the file ms_svr.c in the attached microfiche Appendix A. In this example, one of the fields in the MSCB is a flag "fSend20 msPkt" that indicates whether a 10 or 20 msec duration should be used to form a packet. If value of flag fSend20msPkt is true, then effectively P(S)=20 msec for all packets in this call.

In this implementation, software 39 (FIG. 11) includes four modules, namely a send module 71, play module 72, a receive module 73 and a command module 74 that when executed by CPU 44 (FIG. 10) implement the formation of packets from snippets and vice versa, and routing of the packets and snippets to the appropriate ones of Ethernet MAC 65 and DSPs 63. Examples of software for modules 71–74 can be found in the functions SenderTask( ), PlayerTask( ), ReceiverTask( ) and CommandTask( ), respectively, in the file ms_svr.c in the attached microfiche Appendix A.

Figure 12:
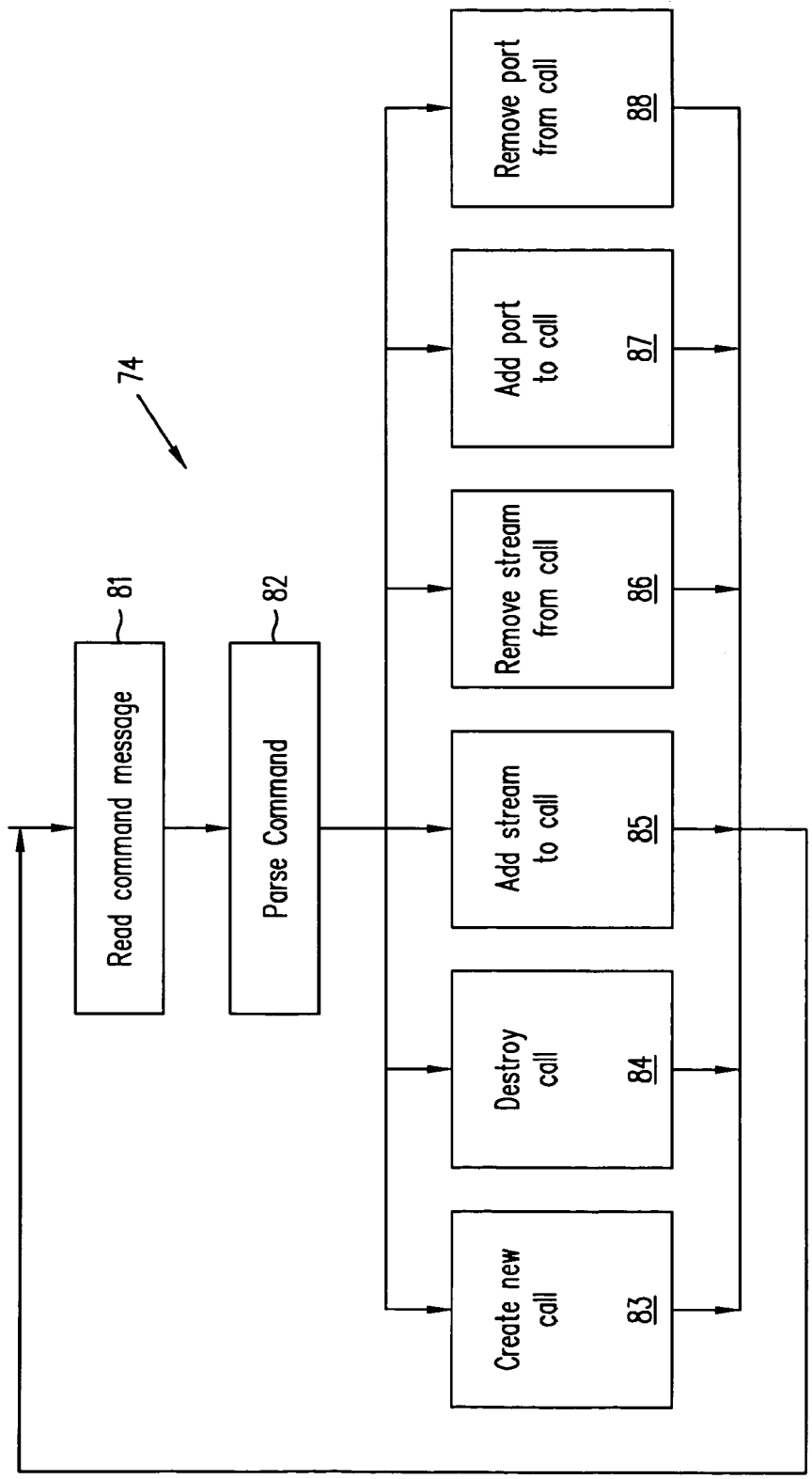
FIGS. 12, 14, 16 and 17 illustrate, in flow chart, acts performed by command module, send module, receive module and play module respectively.
Figure 13:
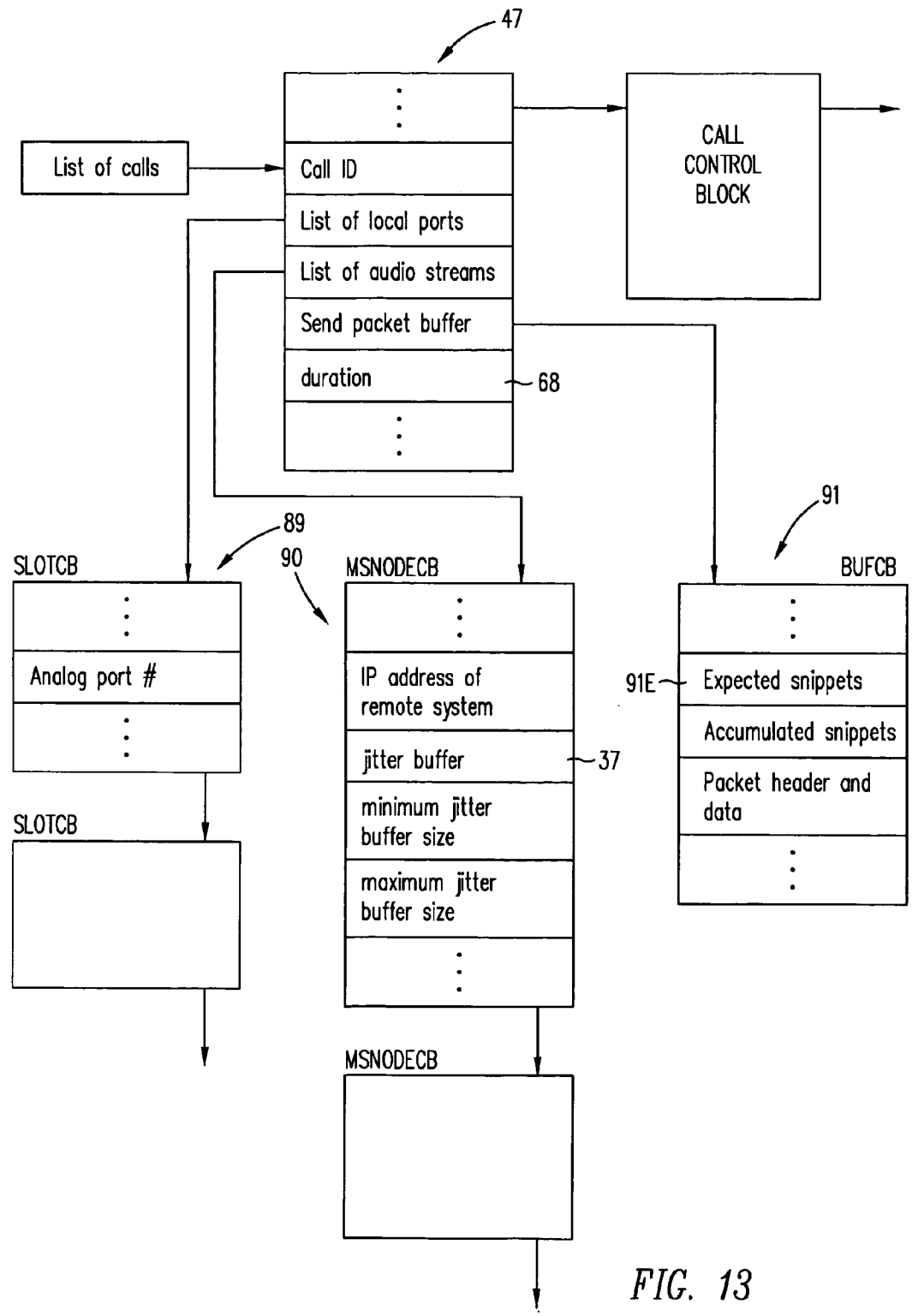
FIG. 13 illustrates in an intermediate-level block diagram, control blocks held in memory for one embodiment of a PBX.

CPU 44 executes command module 74 in response to a command message by reading the command message (see act 81 in FIG. 12) and parsing the command (see act 82). After determining the type of command, CPU 44 performs one of acts 83–88 to respectively create a new call, destroy an existing call, add a new stream to an existing call (e.g. by adding a MSNODECB structure as illustrated in microfiche appendix A), remove an existing stream from a call, adding a port to a call and removing a port from a call. In performing any of acts 83–88, CPU 44 updates call control block 47 (FIG. 13), e.g. by allocating space in memory 43 (FIG. 10) for control block 47, saving the address of the allocated space, and inserting values for various variables in the allocated space, such as the call identifier, a list of local ports (a pointer to a slot control block 89), a list of streams (a pointer to a stream control block 90), and a send packet buffer (also described below).

All information specific to a stream is held in a stream control block that is allocated for each stream, and that contains various variables such as the IP (Internet) address of a remote device and a jitter buffer 37 for the current stream. A buffer control block 91 holds the accumulated snippets, as well as the packet header, for formation of a packet. When the necessary number of snippets have been accumulated, CPU 44 updates the packet header, and transmits the packet embedded in buffer control block 91, as described below in reference to send module 71. An example of block 91 is illustrated by the structure BUFCB in microfiche appendix A, defined in ms_svr.c.

In addition to updating the just-described fields of call control block 47, when executing command module 74 CPU 44 also updates field 68 when one or more audio stream(s) being added (that turn a 2-way call into a 3-way conference call) cause a predetermined limit on the processing requirements to be reached (or exceeded). For example, the flag fSend20msPkt in the MSCB may get set to true if the number of three-way conference calls exceeds 5 (or 1 or 0 in two alternative implementations). This logic is illustrated in microfiche Appendix A in the function NodeCreate( ). The value in field 68 is used by send module 71 to transmit the necessary number of snippets in each packet.

Figure 14:
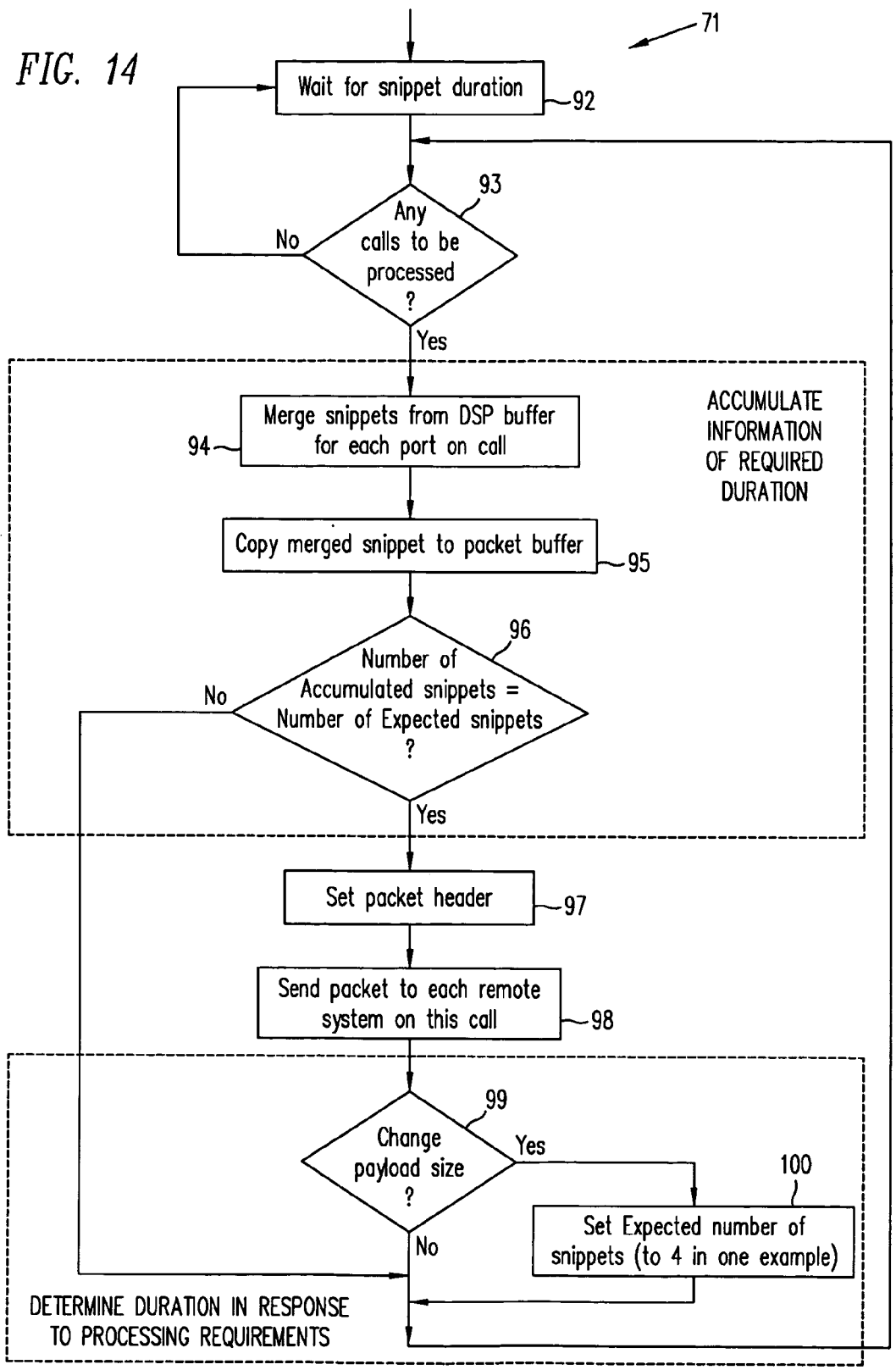

CPU 44 executes various acts 92–100 in send module 71 (FIG. 14) periodically, wherein the period is the duration of each snippet (e.g. every 5 msec). Specifically CPU 44 starts in act 92 by waiting for a snippet duration, and thereafter checks (in act 93) if any calls need to be processed. If the condition is true, CPU 44 reads one or more snippets (generated by DSP 63 for each port) for this call from incoming information buffer 45 (FIG. 11), and merges the read snippets into a single snippet (by any method such as summing values of the information for each sampling, e.g. by adding all first bytes, all second bytes and so on), and stores (see act 95 in FIG. 13) the merged snippet in send packet buffer 91 (FIG. 13) that forms a portion of the outgoing packet buffer 35 (described above).

Figure 15:
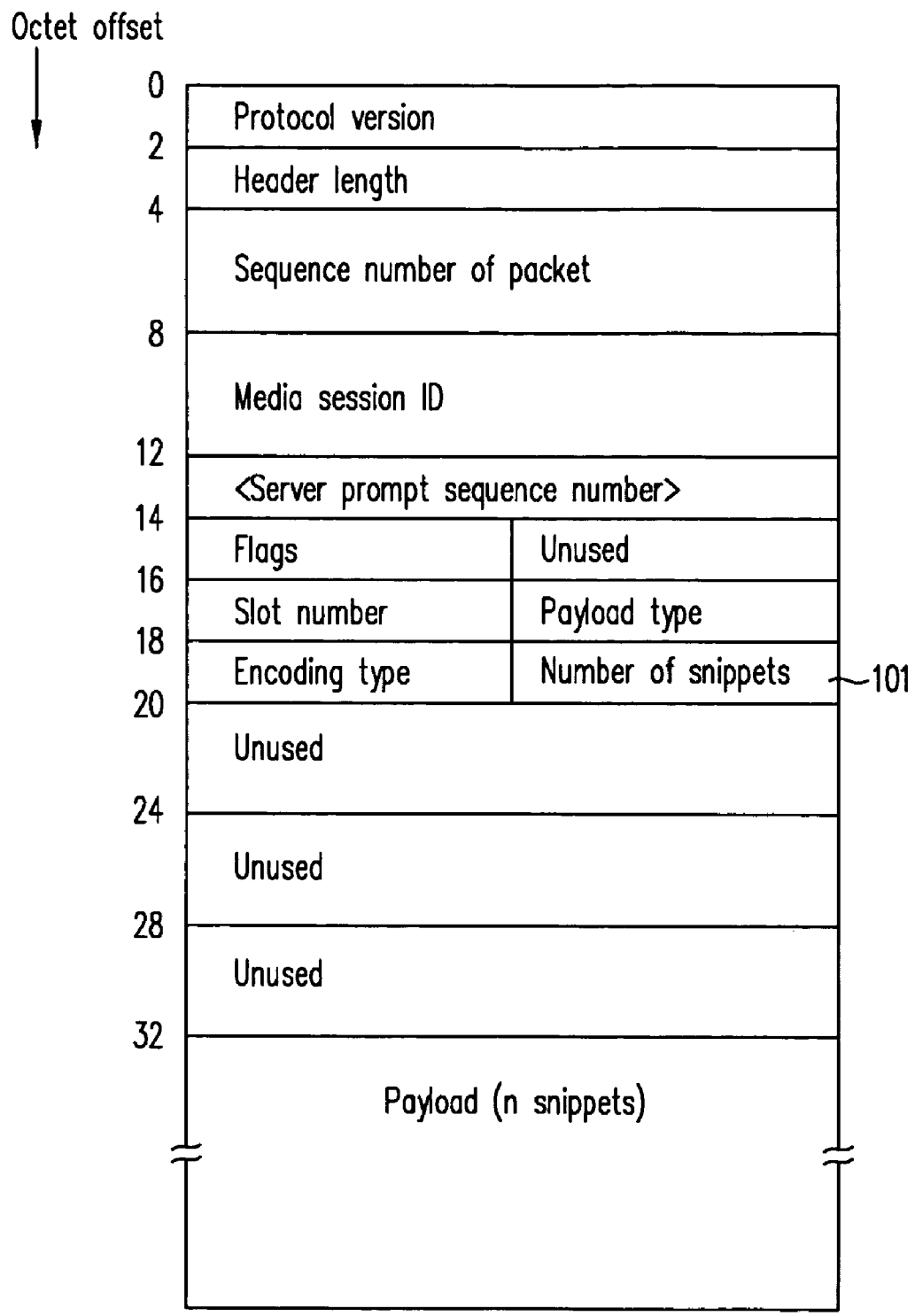
FIG. 15 illustrates a header used by the send module of FIG. 13 to form a packet.

Next, CPU 44 checks (see act 96 in FIG. 14) if the number of accumulated snippets in buffer 35 is equal to the number of expected snippets (determined from variable "duration" that was initialized by command module 74 as described above) in field 91E in FIG. 13. If so, CPU 44 sets (see act 97 in FIG. 14) various variables in a packet header (FIG. 15), and sends (see act 98) the packet to ethernet MAC 65 (FIG. 10) for transmission on packet switching network 22 (FIG. 6). Note that if a number of devices need to receive the packet (e.g. in a conference call), CPU 44 sends the same packet (except for header) to each of these devices. Thereafter, CPU 44 checks (see act 99 in FIG. 14) if there needs to be a change in the payload size, based on the occurrence of a predetermined event (as described above). If so, CPU 44 sets (see act 100 in FIG. 14) the expected number of snippets (in field 91E illustrated in FIG. 13) to be a larger number than the number currently being used.

In the implementation illustrated by microfiche appendix A, structure BUFCB has an nSnippetsExpected field (see field 91E in FIG. 13), which describes the number of snippets to be transmitted in the packet, and an nSnippetsSeen field, which describes the number of snippets accumulated. Field nSnippets is set to the appropriate value after examining flag fSend20 msPkt (described above) after each packet is transmitted (see the function SendBuf( )). For example, the number of snippets may be increased to 4 (from an original 2). Thereafter, CPU 44 returns to waiting in act 92, and in the next iteration of act 96 uses the increased number of snippets (thereby to implement the change in information duration in the next packet being transmitted).

Figure 16:
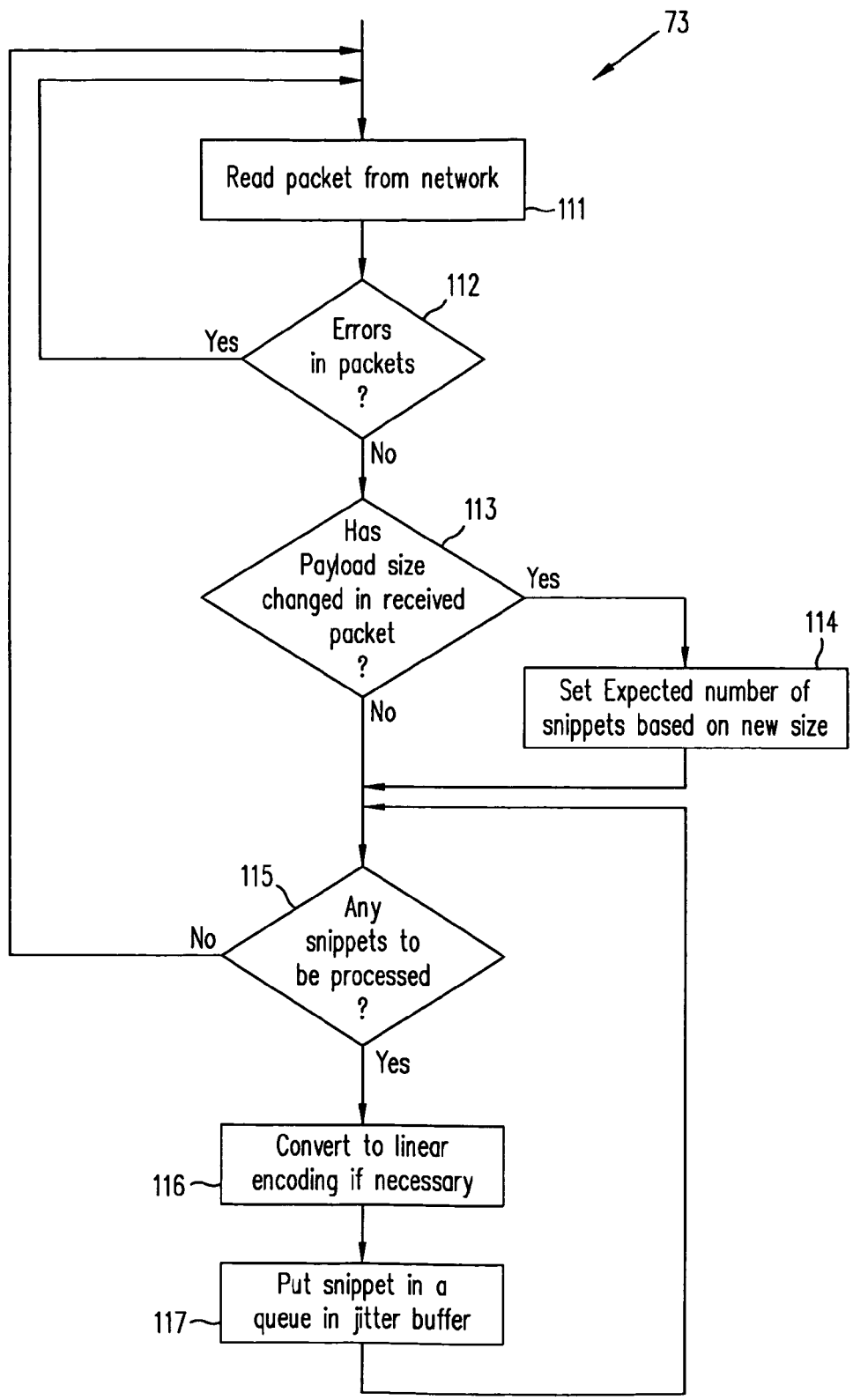

In this implementation, each packet (FIG. 15) is sent as a UDP datagram, as further defined in microfiche appendix A, in the file mshdr.h by the typedef MEDIAPACKET. Field 101 (see FIG. 15) entitled "NUMBER OF SNIPPETS" indicates the payload size in the packet. Field 101 is used by CPU 44, when executing instructions in receive module 73 (FIG. 16) to update the duration field 68 (described above), to respond to changes in processing requirements in a remote device. Specifically, in act 111, CPU 44 reads a packet received from packet switched network 22 (FIG. 6), and checks (in act 112) if there are any errors, and if so, simply returns to act 111. If there are no errors, CPU 44 checks (in act 113) if the payload size has changed (e.g. by comparing the duration with the duration indicated by field 101 illustrated in FIG. 15). If so, CPU 44 sets the expected number of snippets (in field 91E illustrated in FIG. 13) based on the new size. In the example illustrated in the microfiche appendix A, CPU 44 sets flag fSend20msPkt to true if it receives a packet with a 20 msec payload size (i.e. 4 snippets).

Thereafter, CPU 44 repeatedly processes all snippets from the received packet by performing acts 115–117. Specifically, in act 115 CPU 44 checks if any snippets are left to be processed, and if not returns to act 111. If a snippet is available for processing, CPU 44 goes to act 116 to convert encoding of the snippet (e.g. from $\mu$law to linear) if necessary, and then puts (in act 117) the snippet in a queue (FIG. 11) formed within a jitter buffer 37 (FIG. 13) for this stream.

Figure 17:
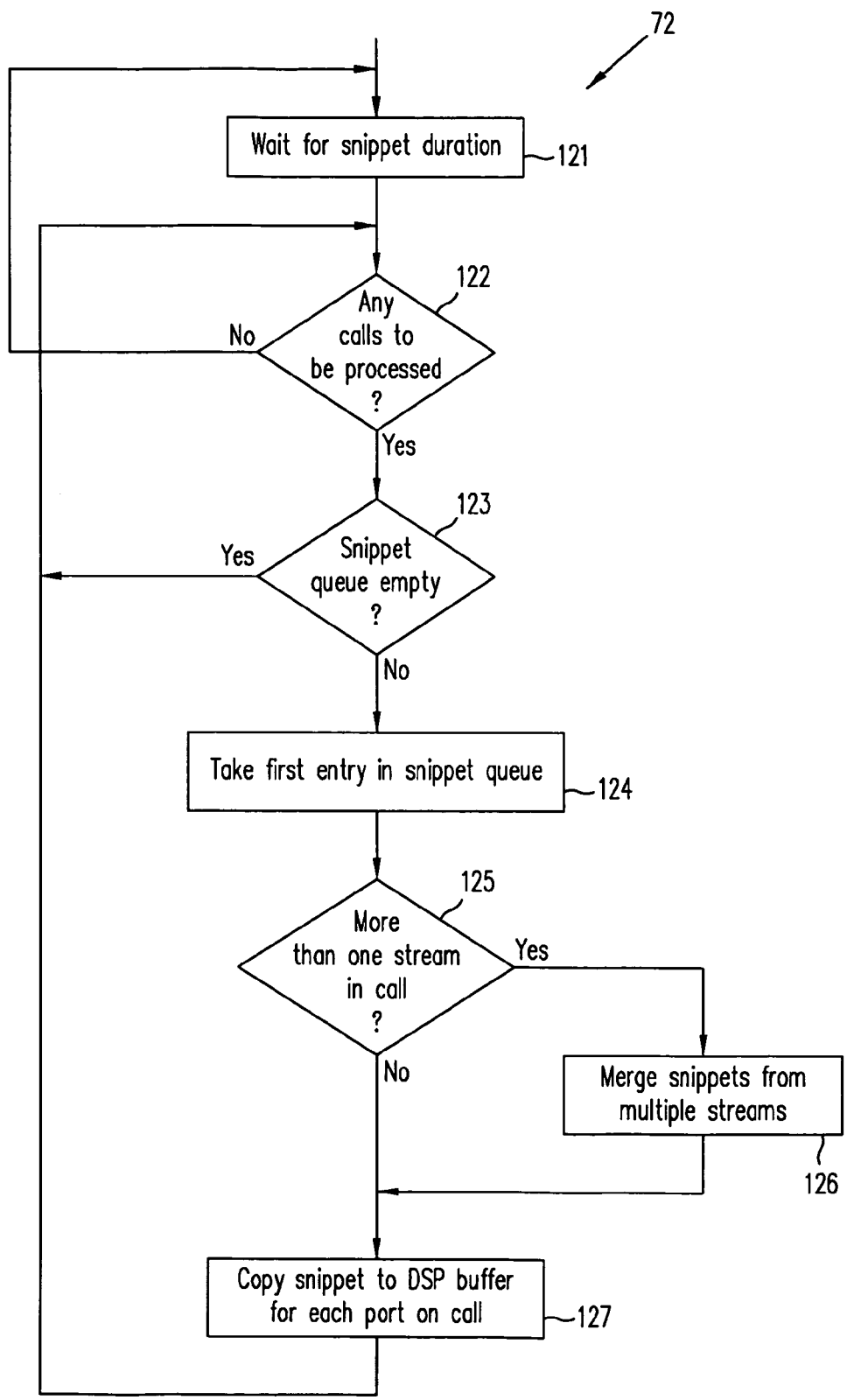
Figure 18:
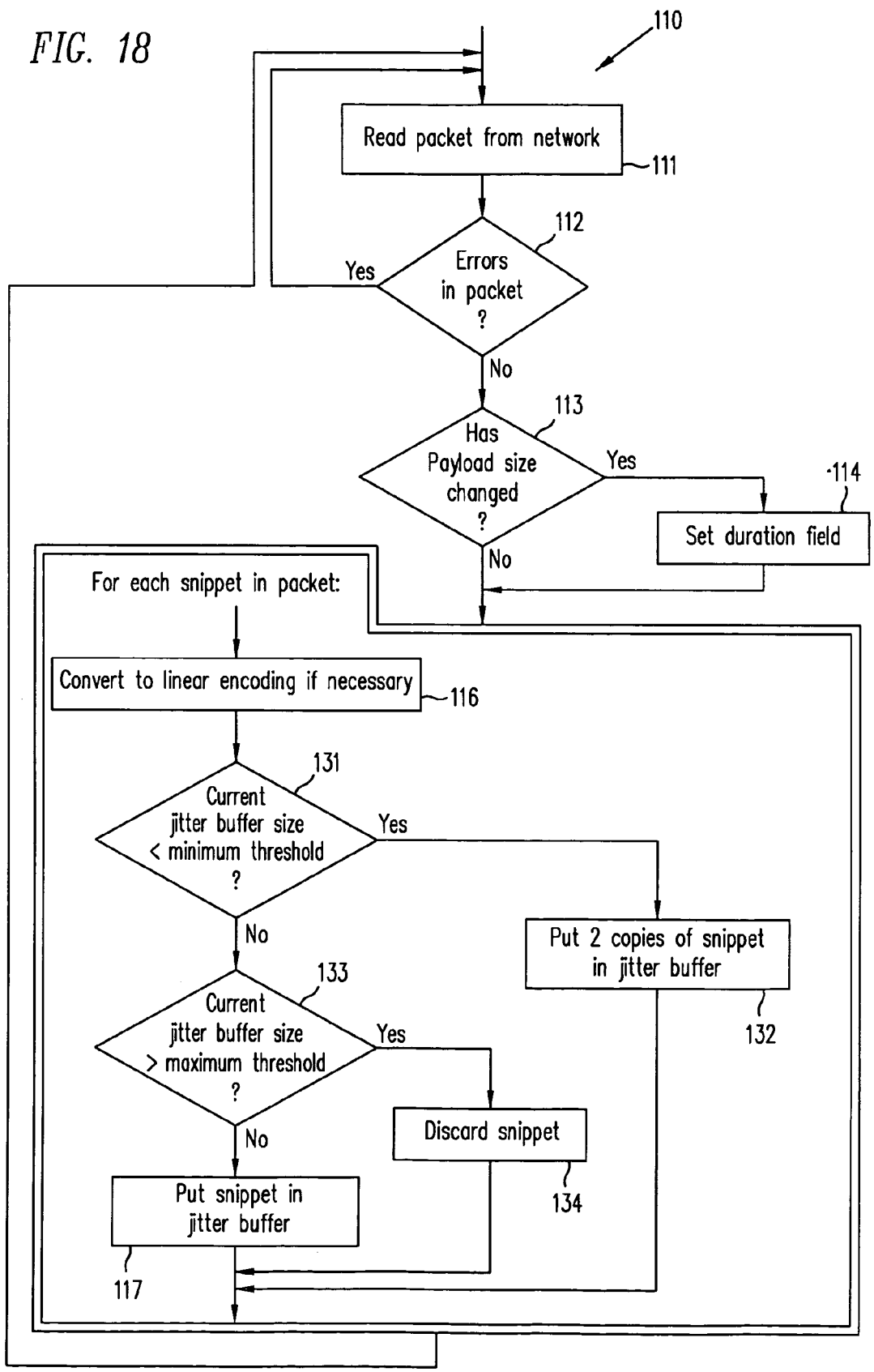
FIG. 18 illustrates, in a flow chart, acts performed by the CPU when programmed with instructions for an alternative embodiment of a receive module that uses a variable-sized jitter buffer capable of reducing the effect of changing payload size (in response to processing requirements).

CPU 44 executes software for player module 72 (FIG. 17) periodically, wherein the period is the duration of each snippet (e.g. every 5 msec). Specifically CPU 44 starts in act 121 by waiting for a snippet duration, and thereafter checks (in act 122) if any calls need to be processed. If the condition is true, CPU 44 checks if the snippet queue is empty (in act 123), and if so returns to act 122 (to check if any additional calls need to be processed). If snippet queue is not empty, CPU 44 starts with the first snippet (in act 124) and checks (in act 125) if the call includes any additional streams. If so, CPU 44 merges (in act 126) snippets from the multiple streams for this call, and copies (in act 127) the merged snippet into the outgoing information buffer 49 (FIG. 11) for use by DSPs 63 (FIG. 10).

Note that in the implementation illustrated in microfiche appendix A, f can only generate values of 10 milliseconds or 20 milliseconds, and the decision criteria is the existing number of 3-way conference calls. Therefore, only a fixed number of 3-way conference calls are allowed to use a 10 milliseconds payload size (e.g. 160 bytes using linear encoding in DSP 63). Once that threshold has been reached, future 3-way conference calls will use a 20 milliseconds payload size.

Various acts shown in FIGS. 12, 14, 16 and 17 are illustrated throughout the software in microfiche appendix A, including as shown in the following table 2.

TABLE 2

| Reference numeral in the Figures | Location of software in microfiche appendix A |
|---|---|
| Act 121 (FIG. 17) | Page A-61, line 32 |
| Act 122 (FIG. 17) | Page A-61, lines 47–49 |
| Act 123 (FIG. 17) | Page A-63, line 10 |

TABLE 2-continued

| Reference numeral in the Figures | Location of software in microfiche appendix A |
|---|---|
| Act 124 (FIG. 17) | Page A-63, lines 7 and 8 |
| Act 125 (FIG. 17) | Page A-64, lines 11 |
| Act 126 (FIG. 17) | Page A-64, lines 23–25 |
| Act 127 (FIG. 17) | Page A-65, line 45 to A-66 line 24 |
| Act 111 (FIG. 16) | Page A-69, lines 5–10 |
| Act 112 (FIG. 16) | Page A-69, line 20 to A-71, line 22 |
| Act 113 (FIG. 16) | Page A-73, lines 48–49 |
| Act 114 (FIG. 16) | Page A-74, line 1 |
| Act 115 (FIG. 16) | Page A-74, line 3 |
| Act 116 (FIG. 16) | Page A-74, lines 41–42 |
| Act 117 (FIG. 16) | Page A-75, line 49 to A-76, line 13 |
| Act 92 (FIG. 14) | Page A-81, line 46 |
| Act 93 (FIG. 14) | Page A-82, lines 10–12 |
| Act 94 (FIG. 14) | Page A-82, line 24 to A-83, line 30 |
| Act 95 (FIG. 14) | Page A-85, line 16 |
| Act 96 (FIG. 14) | Page A-78, line 6 |
| Act 97 (FIG. 14) | Page A-78, lines 9–16 |
| Act 98 (FIG. 14) | Page A-78, line 25 to A-80, line 38 |
| Act 99 (FIG. 14) | Page A-80, line 43 |
| Act 81 (FIG. 12) | Page A-124, line 9 |
| Act 82 (FIG. 12) | Page A-124, line 13 |
| Act 83 (FIG. 12) | Page A-124, lines 15–24 |
| Act 84 (FIG. 12) | Page A-124, lines 25–38 |
| Act 85 (FIG. 12) | Page A-124, line 39 to A-125 line 18 |
| Act 86 (FIG. 12) | Page A-125, lines 20–32 |
| Act 87 (FIG. 12) | Page A-125, line 33 to A-126, line 1 |
| Act 88 (FIG. 12) | Page A-126, lines 2–18 |

In one implementation described above in reference to Tables 1 and 2 and microfiche appendix A, a predetermined event is set to occur when the total number of streams being processed by CPU 44 exceeds 30, and in response CPU 44 changes the information duration from 10 milliseconds to 20 milliseconds.

In another embodiment, CPU 44 executes instructions for an alternative receiver module 110 to perform acts 111–117 described above in reference to FIG. 16, and in addition to perform acts 131–134 to dynamically alter the number of snippets (e.g. the queue length) in jitter buffer 37 (FIG. 11) in the following manner. Specifically, after act 116, CPU 44 goes to act 131 and checks if the number of snippets in buffer 37 is lower than a predetermined minimum threshold, and if so goes to act 132 and inserts two copies of the current snippet into buffer 37 (into the queue). If the condition is not satisfied, CPU 44 checks if the number of snippets in buffer 37 is greater than a predetermined maximum threshold, and if so goes to act 134 to discard the snippet. If this condition is also not satisfied, CPU 44 goes to act 117 (described above). Acts 131–134 are illustrated by the software in Appendix B.

Acts 131–134 result in a single snippet being played twice, if snippets are not being received at a fast enough rate to keep up with playing of information in real time. Moreover, acts 131–134 result in a snippet being dropped, if snippets are being received faster than the rate of playing of the information in real time. Therefore, when jitter buffer 37 is sufficiently large, acts 131–134 minimize the effects of changing payload size (due to change in information duration) as described herein. For example, if the payload size is changed from information of 10 millisecond duration to information of 20 millisecond duration, there is a 10 millisecond delay between arrival times of packets before and after the switchover. Such a delay is filled by previously received snippets present in jitter buffer 37. At some later point if jitter buffer 37 falls short of the minimum size, a later received snippet may be replayed.

As an example, the minimum and maximum sizes for jitter buffer 37 for calls routed only through a local area network (LAN) are set at 5 milliseconds and 20 milliseconds respectively. For calls routed over a long distance, e.g. over a wide area network (WAN), the corresponding limits are set at 15 milliseconds and 35 milliseconds respectively. The larger limits are required in a WAN environment to account for the greater round trip delay (due to propagation and due to delay associated with the network itself, e.g. queues in routers).

Figure 19:
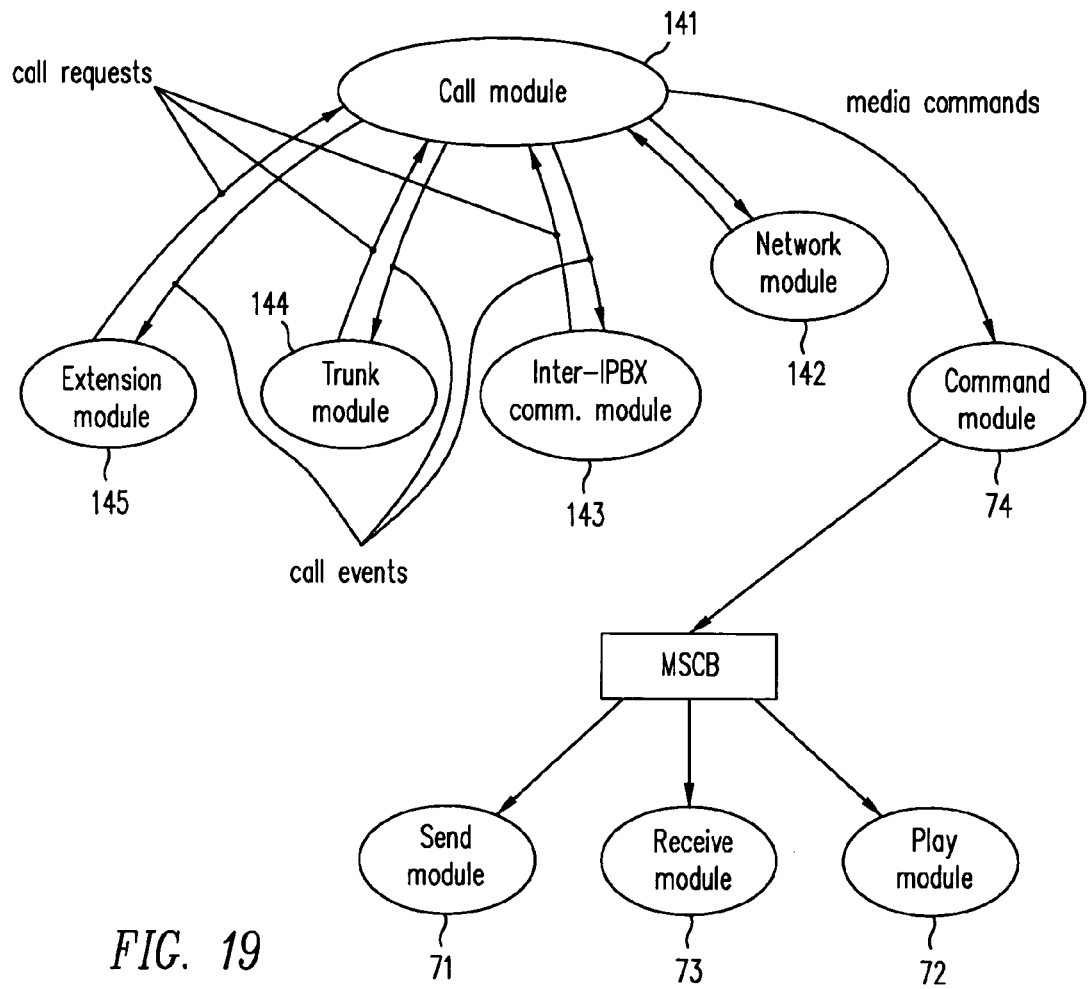
FIG. 19 illustrates, in a block diagram, interaction among various modules implemented by a CPU for one embodiment of a PBX.
Figure 20:
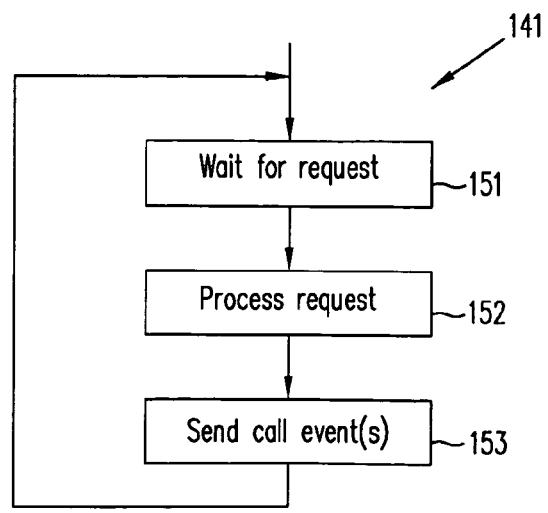
FIGS. 20–24 illustrate, in flow chart, acts performed by call module, network module, inter-PBX module, trunk module and extension module respectively.

In one implementation, in addition to modules 71–74, software 39 includes additional modules 141–145 illustrated in FIG. 19. In this implementation, call module 141 includes instructions for setting up and tearing down calls. Specifically, in act 151 (FIG. 20), CPU 44 waits for a request to be generated by any of trunk module 141, extension module 145, inter-PBX module 143 (that interface with telephone company's central office, local telephone instruments, and other PBXs of the type described herein). For example, extension module 145 may generate a request based on a phone number being dialed on a telephone instrument connected to an analog port 66A (FIG. 10). In response to such a request, CPU 44 processes the request (in act 152 in FIG. 20) locally by looking up a routing table to identify whether the destination device is same as the local device (as may be the case for an internal call) and setting up a call control block, for example. Next, CPU 44 sends events (in act 153) to other modules that need to set up the call (e.g. sends an event back to extension module 145 to set up an internal call), and thereafter returns to act 151 (described above).

Figure 21:
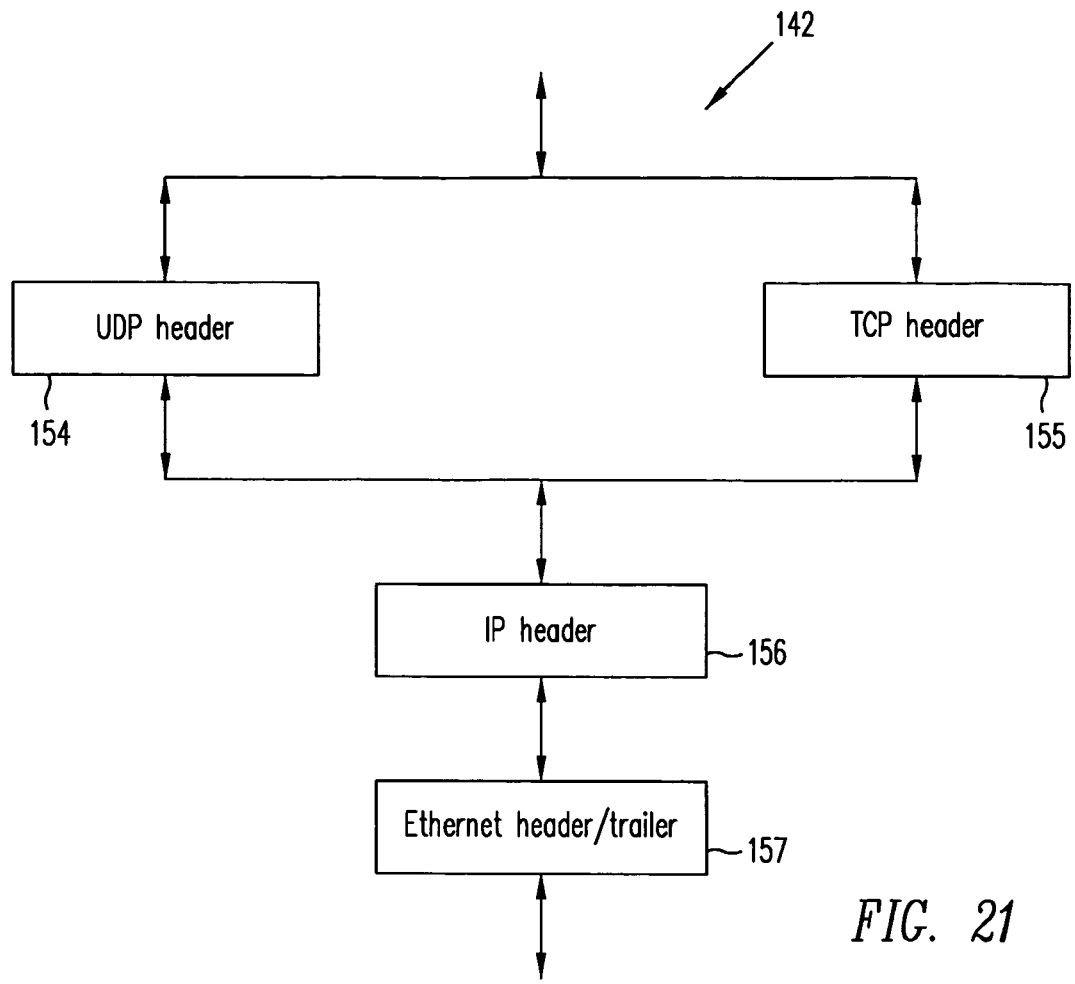

In this implementation, network module 142 (FIG. 21) includes instructions for transmitting a packet over the Internet, e.g. by adding a UDP header as illustrated by act 154 or by adding a TCP header as illustrated by act 155, followed by adding an IP header as illustrated by act 156, and an ethernet header and trailer as illustrated by act 157. CPU 44 uses network module 142 to implement a sending act 98 described above in reference to FIG. 14. Note that instead of network module 142, any software known as "TCP/IP stack" can be used.

Figure 22:
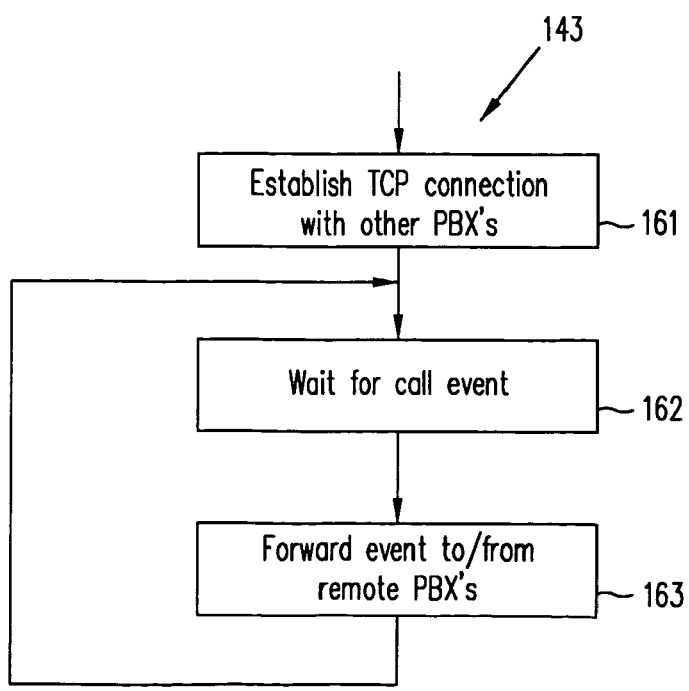

Furthermore, in this implementation, inter-PBX module 143 includes instructions for forwarding events and information to/from other PBXs, thereby to act as a proxy for the extension and trunk modules (described below) in the other PBXs. Specifically, in act 161 (FIG. 22), CPU 44 establishes a TCP connection with each of a number of other PBXs that are coupled to PBX 60 (FIG. 10; e.g. via port 67). Next, in act 162, CPU 44 waits for a call event, and on receipt of the event, forms a packet and forwards (in act 163) the packet to an appropriate module in the other PBX.

Figure 23:
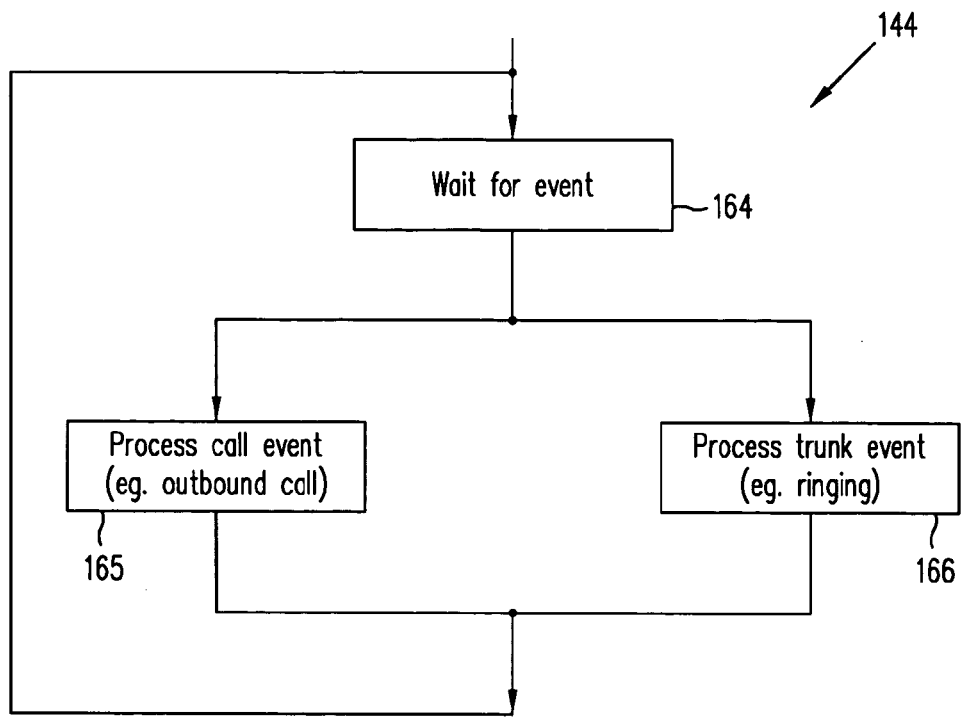

Also, in this implementation, trunk module 144 includes instructions for interfacing to external trunk lines. Specifically, in act 164 (FIG. 23), CPU 44 waits for an event to be generated by call module 141 or by receipt of a ringing tone on the trunk line. In response to the event from module 141, CPU 144 sets up the outbound call (in act 165), e.g. passes to a trunk a sequence of telephony signals including DTMF codes for the phone number being dialled. In response to receipt of ringing tone, CPU 144 sets up an inbound call (in act 166) e.g. requests call module 141 to route the call, and passes a sequence of telephony signals (e.g. an off-hook signal) on a trunk.

Figure 24:
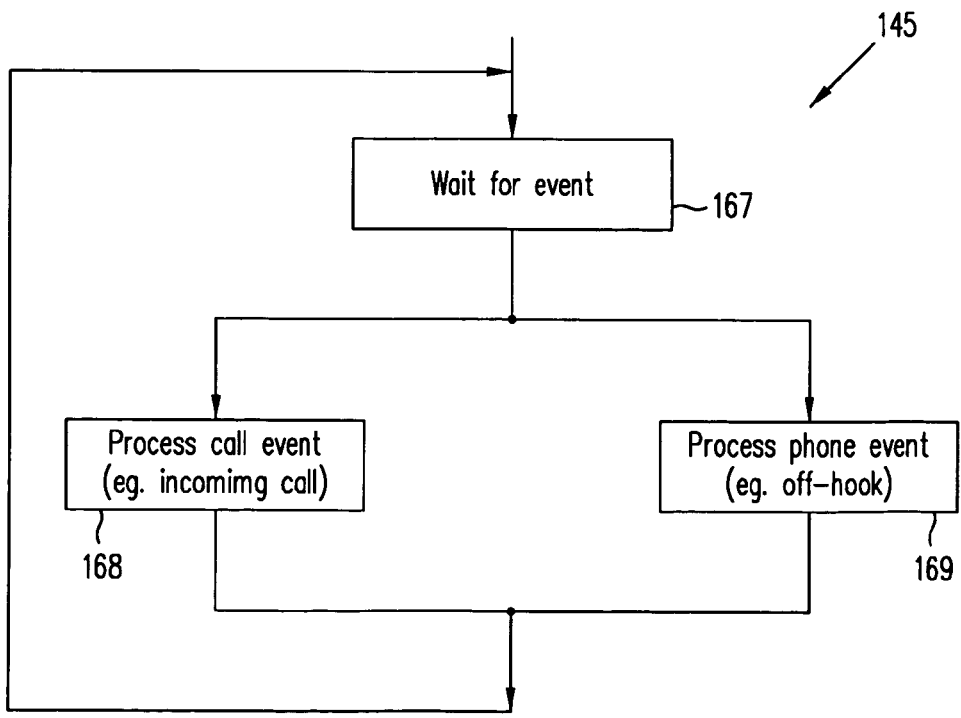

Similarly, extension module 145 includes instructions for interfacing to internal telephone instruments. Specifically, in act 167 (FIG. 24), CPU 44 waits for an event to be generated by call module 141 or by receipt of an off-hook signal on an internal line. In response to the event from module 141, CPU 144 sets up the incoming call (in act 168), e.g. rings the telephone. In response to receipt of off-hook signal, CPU 144 sets up an outbound call (in act 169) e.g. collects the DTMF codes from the internal line, and based on the digits in the codes request the call module to route the call.

Numerous modifications and adaptations of the embodiments and implementations described herein will be apparent to the skilled artisan in view of the disclosure. For example, although a specific packet format has been described herein, other packet formats can be used, e.g. the above-described RTP defined by IETF in the standard RFC 1889 can be used in an alternative embodiment. In such an alternative embodiment, CPU 44 determines the payload's duration based on the length of the payload data (in bytes) in the UDP header, and the audio encoding being used in the RTP header (i.e. both are determined from the same RTP packet).

Note also that although some acts are illustrated as being performed sequentially in a specific order, in other embodiments such acts can be performed in any other order. For example, in FIG. 5, act 32A occurs asynchronously with respect to acts 27A–29A that are preformed sequentially. As another example, acts 52 and 53 can be performed in reverse of the order illustrated in FIG. 8.

Moreover, although only two embodiments for changing the information duration have been described (specifically, either change for all streams, or only for new streams), in an alternative embodiment the information duration can be changed selectively, e.g. based on the type of information being processed (audio v/s facsimile), or based on the telephone numbers involved (e.g. a company president's call may be left unchanged whereas all other calls may be changed).

Also, an act of duration determination (e.g. act 27A) can be performed immediately after a packet is formed, instead of prior to packet formation as described above. Furthermore, processing requirements can be indicated by a rate of transmission of packets at the ethernet port.

Also, although in one implementation the number of snippets is changed from 2 snippets to 4 snippets on occurrence of a predetermined event, there can be an intermediate stage of using 3 snippets, and there can be additional stages of using 5, 6 or more snippets.

Furthermore, information duration can also be reduced when processing requirements start to fall below predetermined limits. So, the predetermined event can be related to improvement in system performance and the device can respond by correspondingly increasing the service quality of the packets being formed.

Also, although in one embodiment two fields, duration 68 and expected number of snippets 91E (FIG. 13) are used, each can be derived from the other and therefore in two alternative embodiments, only duration 68 is used or only expected number of snippets 91E is used.

Furthermore, although certain examples of snippet numbers have been described as being used to form a payload in response to different processing requirements, any arbitrary numbers of snippets can be used. For example, a function could be used to compute the number of snippets from one or more statistics on processing requirements (e.g. the number of snippets could be 4* the percentage of CPU utilization). Moreover, such a function could change over time, so that appropriate values for the number of snippets to be used in a payload can be learned in a manner similar to (or even using) neural networks.

Also, a router in the packet switched network can send an out-of-band message to an end device of the type described herein to cause the end device to reduce the rate of packet generation, thereby to ease the processing requirements being imposed on the network. Furthermore, a network monitoring tool in conformance with SNMP protocol can be used to collect network statistics, and the predetermined event could be related to such network statistics, thereby eliminating the need for a router to send the out-of-band message and yet be responsive to performance of the network.

Numerous such modifications and adaptations of the embodiments and implementations described herein are encompassed by the attached claims.

APPENDIX B

```
/*
 * changes to ms_svr.c for
 * receiver task with adaptable jitter buffer
 */
#define MIN_LOCAL_JITTER                1       /* min current jitter buffer for local streams */
#define MIN_REMOTE_JITTER               3       /* min current jitter buffer for remote streams
*/
#define MIN_VM_JITTER                   5       /* min current jitter buffer for VM/AA */
#define LOCAL_JITTER                    1       /* desired jitter buffer for local */
#define REMOTE_JITTER                   4       /* desired jitter buffer for remote */
#define VM_JITTER                       7              /* desired jitter buffer for VM/AA */
#define MAX_LOCAL_JITTER                4       /* max jitter buffer for local */
#define MAX_REMOTE_JITTER               7       /* max jitter buffer for remote */
#define MAX_MAX_JITTER                          12
#define MAX_JITTER_OUTOFRANGE_SECS 5    /* max time jitter buffer can be out of min/max range */
#define MIN_SENDER_IDLE_MS              500     /* declare sender idle if no pkts recv'd for this
amount of time */
#define MAX_PROXY_SILENT_TICKS_MS   400
                                                                /* max time
proxy sends silence if no VM packets received */
#define    RECVRTQUEUEDEPTH_MAX         (2*MAXREALTIMESNIPPETS+nMaxRemoteJitter)
#define    RECVVMQUEUEDEPTH_MAX         (2*MAXVOICEMAILSNIPPETS+MAX_MAX_JITTER)
#define SNIPPET_RING_MAX                (2*MAXVOICEMAILSNIPPETS+MAX_MAX_JITTER)
typedef struct
```

APPENDIX B-continued

```
{
        char                    cEC[2];
        /* list entry pointer(s) */
        PLLIST                  pListGlobal;
        PLLIST                  pListMSCB;
        PLLIST                  pListBufCB;
        /* parameters */
        DWORD                   dwIPAddr;
        MSPAYLOAD               MSPayloadType;
        /* state */
        BOOL                    fRealTime;              /* real time node vs voice mail node. */
        BOOL                    fUseProxy;              /* use a network extension (e.g., voice mail)
proxy. */
        DWORD                                           /* bit mask representing this node in stream. */
        IDCHANNEL                                       /* real or mapped channel. */
        int
        DWORD                                           /* last time we received a packet */
        BOOL                                            /* first packet seen */
        BOOL
        BOOL
        int
        int
        int                     nJitter;                /* jitter buffer size in ticks */
        int                     nMinJitter;
        int                     nMaxJitter;
        int                     nUnderFlow;
        int                     nOverFlow;
        int                     nProxySilentTicks;
#ifdef __WANT__MAPPING
        PMAPCB                  pMapCB;
#endif
        PMSCB                   pMSCB;
        PNODECB                 pNodeCB;
#ifdef NO__FAST__SNIPPETS
        /* Receiving */
        LLISTHEAD               ReceivedSnippetCBList;
        /* Proxy receive capture */
        LLISTHEAD               ProxyRecvSnippetCBList;
#else
        /* Receiving */
        SNIPPETRING             ReceivedSnippetCBRing;
        /* Proxy receive capture */
        SNIPPETRING             ProxyRecvSnippetCBRing;
#endif /* NO__FAST__SNIPPETS */
        /* statistics */
        DWORD                   dwPlayerWaiting;
        DWORD                   dwOverFlows;
        DWORD                   dwUnderFlows;
} MSNODECB;
#define SNIPPET__RING__COUNT(pSnippetRing, count)       \
        {                                                                                       \
                if (((count) = (pSnippetRing)->nWriteIndex − (pSnippetRing)->nReadIndex) <0) \
                        (count) += (pSnippetRing)->nRingSize;                                   \
        }
#define SNIPPET__RING__HEAD(pSnippetRing, pSnippetCB)   \
        (pSnippetCB) = (pSnippetRing)->pRing[(pSnippetRing)->nReadIndex]
#define SNIPPET__RING__REMOVE(pSnippetRing)             \
        {                                                                                       \
                (pSnippetRing)->pRing[(pSnippetRing)->nReadIndex] = NULL;               \
                (pSnippetRing)->nReadIndex =                                            \
                        ((pSnippetRing)->nReadIndex + 1) % (pSnippetRing)->nRingSize;   \
        }
        int             nLocalJitter = LOCAL__JITTER;
        int             nRemoteJitter = REMOTE__JITTER;
        int             nVMJitter = VM__JITTER;
        int             nMinLocalJitter = MIN__LOCAL__JITTER;
        int             nMinRemoteJitter = MIN__REMOTE__JITTER;
        int             nMinVMJitter = MIN__VM__JITTER;
        int             nMaxLocalJitter = MAX__LOCAL__JITTER;
        int             nMaxRemoteJitter = MAX__REMOTE__JITTER;
```

APPENDIX B-continued

```
int                nMaxVMJitter = 0xffff,
int                nMaxTimeJitterOutOfRange = (MAX_JITTER_OUTOFRANGE_SECS *
HH_INTERRUPTS_PER_SECOND);
DWORD              dwMinTicksSenderIdle = (MIN_SENDER_IDLE_MS/HH_INTERRUPT_INTERVAL_MS);
/*===========================================================================*
 * Receiver Task
 *
 *===========================================================================*/
/*----------------------------------------------------------------*
 * ReceiverTask
 *
 *----------------------------------------------------------------*/
void               ReceiverTask(
                                void
                                )
{
        BOOL       fSkip;
        BOOL       fTimingSlot;
        DWORD      dwIPAddr;
#ifdef _WANT_NODESTATS
        DWORD      dwDSPRTPacketTickCopy;
#endif
        int        nLen;
        int        nsinlen;
        int        nSnip;
        int        nSnipLen;
        int        nCount;
        int        nRepeat;
        int        nDrop;
        PBUFCB     pBufCB;
        PBYTE      pbSnippet;
#ifdef_WANT_MAPPING
        PMAPCB     pMapCB = NULL;
#endif
        PMSCB      pMSCB = NULL;
        PMSNODECB  pMSNodeCB = NULL;
        PNODECB    pNodeCB;
#ifdef _WANT_NODESTATS
        PNODESTATCB pNodeStatCB;
#endif
        SOCKADDR_IN sin;
        SOCKET     SocketRecv;
        WORD       wClipSequenceNo;
        init_task_exceptions( );
        TRACE1("\nstart task - %s", taskName(0));
        /* create socket. */
        SocketRecv = socket(AF_INET, SOCK_DGRAM, IPPROTO_UDP);
        if(SocketRecv == INVALID_SOCKET)
        {
                /* socket failed. */
                stts_error(STTS_MODULE_MS, _FUNCTION_, STTS_CAUSE_SOCKET);
                return;
        }
        if(setsockopt(SocketRecv, SOL_SOCKET, SO_RCVBUF, (char *)&UdpBufSize, sizeof(UdpBufSize)) ==
ERROR)
        {
                stts_error(STTS_MODULE_MS, _FUNCTION_, STTS_CAUSE_SETSOCKOPT);
        }
        /* bind. */
        memset((void*)&sin, 0, sizeof(sin));
        sin.sin_family = AF_INET;
        sin.sin_addr.s_addr = htonl(INADDR_ANY);
        sin.sin_port = htons(IPPORT_MCRECV);
        if(bind(SocketRecv, (struct sockaddr*)&sin, sizeof(sin)) == SOCKET_ERROR)
        {
                /* bind failed. */
                stts_error(STTS_MODULE_MS, _FUNCTION_, STTS_CAUSE_BIND);
                return;
        }
        semGive(hEventInitialized);
        /**/
        LockCBs( );
        /**/
        pBufCB = NULL;
        while (TRUE)
```

APPENDIX B-continued

```
                {
                        if(pBufCB != NULL)
                                PutBufCB(pBufCB);
                        pBufCB = GetBufCB( );
                        if (pBufCB == NULL)
                        {
                                        stts_error(STTS_MODULE_MS, _FUNCTION_, STTS_CAUSE_OOMEM);
/* CONTINUE */
                                        continue;
                        }
                        UnlockCBs( );
                        /**/
                        nsinlen = sizeof(sin);
                        nLen = recvfrom(SocketRecv,
                                        (char*)&(pBufCB->MediaPacket),
                                        sizeof(MEDIAPACKET),
                                        0 /* flags */,
                                        (struct sockaddr *)&sin,
                                        (int*)&nsinlen);
                        /**/
                        LockCBs( );
                        /* in case we are interrupted. */
#ifdef _WANT_NODESTATS
                        dwDSPRTPacketTickCopy = dwDSPRTPacketTick;
#endif
                        /* check for valid packet. */
                        if((nLen < sizeof(MEDIAPACKETHEADER)) ||
                                (pBufCB->MediaPacket.mph.wVersion != MPVERSION))
                        {
                                /* not a valid packet. */
                                dwInvalidPackets++;
/* CONTINUE */
                                continue;
                        }
                        /* get source ipaddress */
                        dwIPAddr = sin.sin_addr.s_addr;
#ifdef _WANT_MAPPING
                        pMapCB = MapFindByidChannel(pBufCB->MediaPacket.mph.idChannel);
                        if (pMapCB != NULL)
                        {
                                pMSCB = pMapCB->pMSCB;
                                /* remap packet header. */
                                pBufCB->MediaPacket.mph.idChannel = pMSCB->idChannel;
                                /* NOTE WELL: let MSNodeFindByIPAddr( ) find the node rather than       */
                                /*                      keeping the node in MAPCB because the map is added
        */
                                /*                      to its global list before the node is added to its    */
                                /*                      global list.
                                                */
                        }
                        else
#endif
                        {
                                /* not being mapped. */
                                pMSCB = MSFindByidChannel(pBufCB->MediaPacket.mph.idChannel);
                                if (pMSCB == NULL)
                                {
                                        /* not a media stream recognized by this switch. */
                                        dwRecvNoMSGB++;
                                        if ((pNodeCB = NodeFindByIPAddr(dwIPAddr)))
                                        {
                                                pNodeCB->dwNextRecvSequenceNo = pBufCB->
MediaPacket.mph.dwSequenceNo + 1;
#ifdef _WANT_NODESTATS
                                                pNodeStatCB = pNodeCB->pNodeStatCB;
                                                pNodeStatCB->dwRecvPacketsTotal++;
                                        }
                                        else if ((pNodeStatCB = NodeStatFindByIPAddr(dwIPAddr)))
                                        {
                                                pNodeStatCB->dwRecvPacketsTotal++;
#endif
                                        }
                                        else
                                        {
                                                dwRecvUnknownNode++;
                                        }
```

APPENDIX B-continued

```
/* CONTINUE */
                        continue;
                }
        }
        pMSNodeCB = MSNodeFindByIPAddr(pMSCB, dwIPAddr);
        if (pMSNodeCB == NULL)
        {
                /* not from a node added to this media stream. */
                dwRecvNoMSNodeCB++;
                if ((pNodeCB = NodeFindByIPAddr(dwIPAddr)))
                {
                        pNodeCB->dwNextRecvSequenceNo = pBufCB->MediaPacket.mph.dwSequenceNo
 + 1;
#ifdef __WANT_NODESTATS
                        pNodeStatCB = pNodeCB->pNodeStatCB;
                        pNodeStatCB->dwRecvPacketsTotal++;
                }
                else if ((pNodeStatCB = NodeStatFindByIPAddr(dwIPAddr)))
                {
                        pNodeStatCB->dwRecvPacketsTotal++;
#endif
                }
                else
                {
                        dwRecvUnknownNode++;
                }
/* CONTINUE */
                continue;
        }
        pNodeCB = pMSNodeCB->pNodeCB;
        fTimingSlot = (pBufCB->MediaPacket.mph.bSlotNo & 0x80);
        pBufCB->MediaPacket.mph.bSlotNo &= ~0x80;
        nSnipLen = (pBufCB->MediaPacket.mph.bEncodingScheme == MSENCODING_LINEAR)?
                                SNIPPETSIZE_LINEAR:SNIPPETSIZE_MULAW;
        if (nSnipLen * pBufCB->MediaPacket.mph.bSnippets + pBufCB->MediaPacket.mph.wLength > nLen)
        {
                /* not a valid packet. */
                dwInvalidPackets++;
/* CONTINUE */
                continue;
        }
#ifdef NOTUSED
        fRealTime (pBufCB->MediaPacket.mph.bPayloadType == MSPAYLOAD_REALTIME)?
                                        TRUE:FALSE;
#endif
#ifdef __WANT_NODESTATS
        pNodeStatCB = pNodeCB->pNodeStatCB;
#ifdef NOTUSED
        if (fTimingSlot)
        {
                if (pNodeStatCB->dwDSPRTPacketTickBase == 0)
                {
                        pNodeStatCB->dwDSPRTPacketTickBase = dwDSPRTPacketTickCopy;
                        pNodeStatCB->dwRTPacketTickArrived = dwDSPRTPacketTickCopy;
                }
                else
                {
                        pNodeStatCB->dwRTPacketTickArrived += pBufCB->MediaPacket.mph.bSnippets/
MINREALTIMESNIPPETS;
                }
                pNodeStatCB->dwRTPacketTicksSampleInterval++;
                pNodeStatCB->dwRTPackets++;
        }
#endif /* NOTUSED */
#endif
        if (!pNodeCB->fFirstRecvSeen)
        {
                TRACE0("\nnew connection");
                pNodeCB->dwNextRecvSequenceNo = pBufCB->MediaPacket.mph.dwSequenceNo;
                pNodeCB->fFirstRecvSeen = TRUE;
        }
        /* check sequence number. */
        if ((pBufCB->MediaPacket.mph.dwSequenceNo != 0) &&
            (pBufCB->MediaPacket.mph.dwSequenceNo != 1) &&
            (pNodeCB->dwNextRecvSequenceNo != pBufCB->MediaPacket.mph.dwSequenceNo))
```

APPENDIX B-continued

```
                {
#if 0
                        char       szBuf[32];
                        struct
                         in_addr iaddr;
#endif
                        if (fDoTrace || fDoTracePerf)
                        {
#if 0
                                iaddr.s_addr = pNodeCB->dwIPAddr;
                                inet_ntoa_b(iaddr, szBuf);
#endif
                                logMsg("seqno for node 0x%x, expected=%d, seen=%d\n,
                                    pNodeCB->dwIPAddr,
                                    (int)pNodeCB->dwNextRecvSequenceNo,
                                    (int)pBufCB->MediaPacket.mph.dwSequenceNo,
                                    0, 0, 0);
                        }
                        dwRecvPacketsMissing++;
#ifdef __WANT_NODESTATS
                        /*
                         * Don't include lost packets from voice mail since its sequence numbering seems
                         * to be busted right now.
                         */
                        if (!pMSNodeCB->fUseProxy)
                        {
                                pNodeStatCB->dwRecvLost++;
                        }
                        pNodeStatCB->dwRecvPacketsMissing++;
#ifdef NOTUSED
                        /* restart node statistics */
                        pNodeStatCB->dwDSPRTPacketTickBase = 0;
                        pNodeStatCB->dwRTPacketTickArrived = 0;
                        pNodeStatCB->dwRTPacketTicksSampleInterval = 0;
#endif/* NOTUSED */
#endif
                }
                pNodeCB->dwNextRecvSequenceNo = pBufCB->MediaPacket.mph.dwSequenceNo + 1;
                wClipSequenceNo = pBufCB->MediaPacket.mph.wClipSequenceNo;
                fSkip = ((pBufCB->MediaPacket.mph.bFlag1 & FLAG1_SKIP) != 0);
#ifdef __WANT_NODESTATS
                /* good place to check node cb statistics. */
#ifdef NOTUSED
                if ((fTimingSlot) &&
                    (pNodeStatCB->dwRTPacketTicksSampleInterval == NODESAMPLEINTERVAL))
                {
                        if (pNodeStatCB->dwRTPacketTickArrived > dwDSPRTPacketTickCopy)
                        {
                                pNodeStatCB->dwOverruns += (pNodeStatCB->dwRTPacketTickArrived -
dwDSPRTPacketTickCopy);
                                /* restart */
                                pNodeStatCB->dwDSPRTPacketTickBase = 0;
                                pNodeStatCB->dwRTPacketTickArrived = 0;
                        }
                        else
                        if (pNodeStatCB->dwRTPacketTickArrived < dwDSPRTPacketTickCopy)
                        {
                                pNodeStatCB->dwUnderruns += (dwDSPRTPacketTickCopy - pNodeStatCB->
dwRTPacketTickArrived);
                                /* restart */
                                pNodeStatCB->dwDSPRTPacketTickBase = 0;
                                pNodeStatCB->dwRTPacketTickArrived = 0;
                        }
                        pNodeStatCB->dwRTPacketTicksSampleInterval = 0;
                }
#endif /* NOTUSED */
                pNodeStatCB->dwRecvPacketsTotal++;
#endif
                dwRecvPacketsTotal++;
                pbSnippet = (BYTE*)((BYTE*)&(pBufCB->MediaPacket) + pBufCB->MediaPacket.mph.wLength);
                /*
                 * If we receive a 20 ms packet from the remote node, then it must have too many
                 * 3 switch conferences going. We can help out that node by sending it 20 ms
                 * packets as well and reduce the number of packets it has to process.
                 */
```

APPENDIX B-continued

```
            if ((pBufCB->MediaPacket.mph.bSnippets == MAXREALTIMESNIPPETS) && !pMSNodeCB->
fUseProxy)
                pMSCB->fSend20msPkt = TRUE;
            nRepeat = 0;
            nDrop = 0;
            if (pBufCB->MediaPacket.mph.bFlag1 & FLAG1_START_TALKSPURT)
            {
                if (fDoTracePerf)
                {
                    char szBuf[32];
                    struct in_addr iaddr;
                    iaddr.s_addr = pMSNodeCB->dwIPAddr;
                    inet_ntoa_b(iaddr, szBuf);
                    logMsg("media stream=%x, node=%s: start talk spurt\n", (int)pMSCB->idChannel,
(int)szBuf, 0, 0, 0, 0);
                }
                pMSNodeCB->fStarted = FALSE;
                pMSNodeCB->fProxyStarted = FALSE;
            }
            else if(dwDSPTick - pMSNodeCB->dwTickLastRecv > dwMinTicksSenderIdle)
            {
                /*
                 * Haven't received a packet in a while - VM/AA probably not sending -
                 * so re-establish jitter buffer
                 */
                if (fDoTracePerf)
                {
                    char szBuf[32];
                    struct in_addr iaddr;
                    iaddr.s_addr = pMSNodeCB->dwIPAddr;
                    inet_ntoa_b(iaddr, szBuf);
                    logMsg("media stream=%x, node=%s: sender idle\n", (int)pMSCB->idChannel,
(int)szBuf, 0, 0, 0, 0);
                }
                pMSNodeCB->fstarted = FALSE;
                pMSNodeCB->fProxyStarted = FALSE;
            }
            else
            {
                SNIPPET_RING_COUNT(&pMSNodeCB->ReceivedSnippetCBRing, nCount);
                if (nCount < pMSNodeCB->nMinJitter)
                {
                    pMSNodeCB->nOverFlow = 0;
                    if ((pMSNodeCB->nUnderFlow += pBufCB->MediaPacket.mph.bSnippets) >
nMaxTimeJitterOutOfRange)
                    {
                        if (fDoTracePerf)
                        {
                            char szBuf[32];
                            struct in_addr iaddr;
                            iaddr.s_addr = pMSNodeCB->dwIPAddr;
                            inet_ntoa_b(iaddr, szBuf);
                            logMsg("media stream=%x, node=%s: correcting for underflow,
nCount=%d\n",
                                        (int)pMSCB->idChannel, (int)szBuf, nCount,
0, 0, 0);
                        }
                        pMSNodeCB->nUnderFlow = 0;
                        nRepeat = 1;
                        pMSNodeCB->dwUnderFlows++;
#ifdef _WANT_NODESTATS
                        pNodeStatCB->dwUnderFlows++;
#endif
                    }
                }
                else if(nCount > pMSNodeCB->nMaxJitter)
                {
                    pMSNodeCB->nUnderFlow = 0;
                    if ((pMSNodeCB->nOverFlow += pBufCB->MediaPacket.mph.bSnippets) >
nMaxTimeJitterOutOfRange)
                    {
                        if (fDoTracePerf)
                        {
                            char szBuf[32];
                            struct in_addr iaddr;
                            iaddr.s_addr = pMSNodeCB->dwIPAddr;
                            inet_ntoa_b(iaddr, szBuf);
                            logMsg("media stream=%x, node=%s: correcting for overflow,
```

APPENDIX B-continued

```
nCount=%d\n",
                                        (int)pMSCB->idChannel, (int)szBuf, nCount,
0, 0, 0);
                            }
                            pMSNodeCB->nOverFlow = 0;
                            nDrop = 1;
                            pMSNodeCB->dwOverFlows++;
#ifdef __WANT_NODESTATS
                            pNodeStatCB->dwOverFlows++;
#endif
                        }
                    }
                }
                pMSNodeCB->dwTickLastRecv = dwDSPTick;
                for (nSnip = 0; nSnip < pBufCB->MediaPacket.mph.bSnippets; nSnip++, pbSnippet += nSnipLen)
                {
                    PSNIPPETCB    pSnippetCB;
                    dwRecvBytesTotal += nSnipLen;
#ifdef __WANT_NODESTATS
                    pNodeStatCB->dwRecvBytesTotal += nSnipLen;
#endif
                    if (nDrop)
                    {
                        --nDrop;
                        continue;
                    }
                    pSnippetCB = GetSnippetCB( );
                    if (pSnippetCB == NULL)
                    {
                        stts_error(STTS_MODULE_MS, __FUNCTION__, STTS_CAUSE_OOMEM);
/* BREAK */
                        break;
                    }
                    pSnippetCB->wClipSequenceNo = 0;
                    if ((pMSNodeCB->fUseProxy) || (pMSCB->nProxyNodes == 0))
                    {
                        /* use if from proxy or there are no proxy nodes (proxy possibly on other switch). */
                        pSnippetCB->wClipSequenceNo = wClipSequenceNo;
                    }
                    pSnippetCB->fSkip = fSkip;
                    if (pBufCB->MediaPacket.mph.bEncodingScheme == MSENCODING_LINEAR)
                    {
                        /* use reference, not copy */
                        pSnippetCB->pbSnippet = pbSnippet;
                        pSnippetCB->pBufCB = pBufCB;
                        IncBufCB(pBufCB);
                    }
                    else
                    {
                        /* convert to linear format. */
                        MULAWToLinear((WORD*)(pSnippetCB->pbSnippet), (void*)pbSnippet,
SNIPPETSIZE_MULAW);
                    }
                    /* network extension proxy processing */
                    if (pMSCB->nProxyNodes > 0)
                    {
                        /* add snippet to receive capture list. */
#ifdef NO_FAST_SNIPPETS
                        /* take dual ownership of snippet. */
                        IncSnippetCB(pSnippetCB);
                        pDiscardSnippetCB =
                            (PSNIPPETCB)ListGiveItemBeforeTakeHeadAtLimit(
                                (PLLIST)&(pMSNodeCB->ProxyRecvSnippetCBList),
                                pSnippetCB->pListProxy,
                                (fRealTime ? RECVRTQUEUEDEPTH_MAX :
RECVVMQUEUEDEPTH_MAX));
                        if(pDiscardSnippetCB != NULL)
                        {
                            /* list overflowed. */
                            PutSnippetCB(pDiscardSnippetCB);
                        }
```

APPENDIX B-continued

```
#else /* NO_FAST_SNIPPETS */
                        if (!SNIPPET_RING_FULL(&pMSNodeCB->ProxyRecvSnippetCBRing))
                        {
                            /* take dual ownership of snippet. */
                            IncSnippetCB(pSnippetCB);
                            SNIPPET_RING_ADD(&pMSNodeCB->ProxyRecvSnippetCBRing,
pSnippetCB);
                            if (nSnip < nRepeat && pMSNodeCB->fUseProxy)
                            {
                                if (!SNIPPET_RING_FULL(&pMSNodeCB->
ProxyRecvSnippetCBRing))
                                {
                                    /* take dual ownership of snippet. */
                                    IncSnippetCB(pSnippetCB);
                                    SNIPPET_RING_ADD(&pMSNodeCB->
ProxyRecvSnippetCBRing, pSnippetCB);
                                }
                            }
                        }
#endif /* NO_FAST_SNIPPETS */
                }
#ifdef NO_FAST_SNIPPETS
                    /* add snippet to tail of receiving list. */
                    pDiscardSnippetCB =
                        (PSNIPPETCB)ListGiveItemBeforeTakeHeadAtLimit(
                            (PLLIST)&(pMSNodeCB->ReceivedSnippetCBList),
                            pSnippetCB->pList,
                            (fRealTime ? RECVRTQUEUEDEPTH_MAX :
RECVVMQUEUEDEPTH_MAX));
                    if(pDiscardSnippetCB != NULL)
                    {
                        /* list overflowed. */
                        PutSnippetCB(pDiscardSnippetCB);
#ifdef _WANT_NODESTATS
                        pNodeStatCB->dwRecvSnippetsOverflowDiscarded++;
#endif
                        dwRecvSnippetsOverflowDiscarded++;
                    }
#else /* NO_FAST_SNIPPETS */
                    /* add snippet to tail of receiving list. */
                    if (SNIPPET_RING_FULL(&pMSNodeCB->ReceivedSnippetCBRing))
                    {
                        /* list overflowed. */
                        PutSnippetCB(pSnippetCB);
#ifdef _WANT_NODESTATS
                        pNodeStatCB->dwRecvSnippetsOverflowDiscarded++;
#endif
                        dwRecvSnippetsOverflowDiscarded++;
                    }
                    else
                    {
                        SNIPPET_RING_ADD(&pMSNodeCB->ReceivedSnippetCBRing, pSnippetCB);
                        if (nSnip < nRepeat)
                        {
                            IncSnippetCB(pSnippetCB);
                            SNIPPET_RING_ADD(&pMSNodeCB->ReceivedSnippetCBRing,
pSnippetCB);
                        }
                    }
#endif /* NO_FAST_SNIPPETS */
            } /* for snippets ... */
        }
        /* -- Task Never Stops --*/
        TRACE1("\nstop task - %s", taskName(0));
} /* ReceiverTask */
```

What is claimed is:

1. A method for transmitting streaming information in a packetized format, the method comprising:
   forming a first packet containing information generated over a first duration; and
   in response to a predetermined event, forming a second packet containing information generated over a second duration, the second duration being longer than the first duration;
   wherein duration is the length of time needed to play out the information in real time; and
   wherein the predetermined event includes an increase beyond a predetermined threshold of processing requirements in a device that transmits or receives the first packet and the second packet.

2. The method of claim 1 wherein:
   information for the first packet and information for the second packet is received from a common information generator.

3. The method of claim 1 wherein:
   information for the first packet is generated by an information generator different from another information generator that generates information for the second packet.

4. The method of claim 1 wherein:
   the predetermined event includes an increase beyond a predetermined threshold of processing requirements in a device that receives the first packet and the second packet.

5. The method of claim 1 wherein:
   the predetermined event includes an increase beyond a predetermined threshold in processing requirements in a device that transmits the first packet and the second packet.

6. A method for transmitting streaming information in a packetized format, the method comprising:
   forming a first packet containing information generated over a first duration; and
   in response to a predetermined event, forming a second packet containing information generated over a second duration, the second duration being longer than the first duration;
   wherein the predetermined event includes an increase beyond a predetermined threshold in processing requirements in a device that transmits the first packet and the second packet; and
   wherein information included in the first packet forms a portion of a first stream between a source device and a destination device, and the source device transfers additional information in at least one additional stream to or from another destination device, the method further comprising:
   determining occurrence of the predetermined event when a predetermined number is exceeded by a total number of streams, including the additional stream and the first stream.

7. The method of claim 1 wherein:
   the first packet has a first size; and
   the second packet has a second size, the second size being larger than the first size.

8. The method of claim 1 further comprising:
   forming said first packet and said second packet in conformance with UDP protocol of Internet.

9. The method of claim 1 further comprising:
   digitizing audio to generate the information.

10. The method of claim 9 further comprising:
    encoding the audio subsequent to digitizing.

11. A method for transmitting streaming information in a packetized format, the method comprising:
    forming a first packet containing information generated over a first duration;
    in response to a predetermined event, forming a second packet containing information generated over a second duration, the second duration being longer than the first duration;
    wherein:
    the information includes a plurality of snippets, each snippet having information received over a predetermined duration; and
    the first packet includes a first number of snippets and the second packet includes a second number of snippets, the second number being greater than the first number;
    maintaining a jitter buffer within a range defined by a maximum size and a minimum size by: adding two copies of a snippet if a current size of the jitter buffer is smaller than a minimum size; dropping a snippet if the current size of the buffer is larger than a maximum size; and adding the snippet to the jitter buffer if the current size of the jitter buffer is between maximum size and minimum size.

12. A device including:
    a memory;
    an information controller coupled to the memory for storing information in the memory;
    a packet controller coupled to the memory for transmitting a plurality of packets stored in the memory; and
    a processor that uses information of a first duration as payload in each of said packets prior to occurrence of a predetermined event, and uses information of a second duration as payload after occurrence of the predetermined event;
    wherein duration is the length of time needed to play out the information in real time; and
    wherein the predetermined event includes an increase beyond a predetermined threshold of processing requirements in a device that transmits or receives the first packet and the second packet.

13. The device of claim 12 wherein:
    the predetermined event is related to processing requirements of said processor.

14. The device of claim 13 wherein:
    the predetermined event is related to deterioration in performance of the processor; and
    the second duration is longer than the first duration.

15. The method of claim 11 wherein:
    the second number is a multiple of the first number.

16. The method of claim 1 further comprising:
    digitizing video to generate the information.

17. The method of claim 6 further comprising:
    digitizing video to generate the information.

18. The method of claim 6 further comprising:
    digitizing audio to generate the information.

19. The method of claim 11 further comprising:
    digitizing video to generate the information.

20. The method of claim 11 further comprising:
    digitizing audio to generate the information.

21. The method of claim 15 wherein:
    the multiple is 2.

22. A method for transmitting streaming information in a packetized format, the method comprising:
    forming a first packet containing a first number of snippets; and in response to an increase in processing requirements, forming a second packet containing snippets of a second number that is larger than the first number;
wherein the packets are formed by a source device; and another device informs the source device about the increase;
wherein:
the first packet and the second packet belong to a first stream (hereinafter "source stream");
said another device generates and transmits another stream (hereinafter "return stream") to the source device; and
said another device informs the source device about need for the increase via an increase in payload size of the return stream.

23. A method for transmitting streaming information in a packetized format, the method comprising:
forming a first packet containing a first number of snippets; and in response to an increase in processing requirements, forming a second packet containing snippets of a second number that is larger than the first number; wherein a destination device that receives the packets holds the snippets temporarily in a jitter buffer before playing information contained in the snippets; and the destination device uses the jitter buffer to average out variations in inter-arrival duration so that the snippets are played out at a uniform rate; maintaining said jitter buffer within a range defined by a maximum size and a minimum size by:
adding two copies of a snippet to the jitter buffer if a current size of the jitter buffer is smaller than a minimum size.

24. A method for transmitting streaming information in a packetized format, the method comprising:
forming a first packet containing a first number of snippets; and in response to an increase in processing requirements, forming a second packet containing snippets of a second number that is larger than the first number; wherein a destination device that receives the packets holds the snippets temporarily in a jitter buffer before playing information contained in the snippets; and the destination device uses the jitter buffer to average out variations in inter-arrival duration so that the snippets are played out at a uniform rate; maintaining said jitter buffer within a range defined by a maximum size and a minimum size by:
dropping a snippet if a current size of the jitter buffer is larger than a maximum size.

25. A device including: a memory; an information controller coupled to the memory for storing information snippets in the memory; a packet controller coupled to the memory for transmitting a plurality of packets stored in the memory; and means for forming a first packet containing a first number of snippets and for forming a second packet containing snippets of a second number that is larger than the first number in response to an increase in processing requirements; wherein: the memory comprises a jitter buffer; and the device further comprises reception means for receiving packets from a network; wherein the reception means uses the jitter buffer to average out variations in inter-arrival duration of the packets being received so that the snippets of the received packets are played out at a uniform rate;
means for adding two copies of a snippet to the jitter buffer if a current size of the jitter buffer is smaller than a minimum size.

26. A device including: a memory; an information controller coupled to the memory for storing information snippets in the memory; a packet controller coupled to the memory for transmitting a plurality of packets stored in the memory; and means for forming a first packet containing a first number of snippets and for forming a second packet containing snippets of a second number that is larger than the first number in response to an increase in processing requirements; wherein: the memory comprises a jitter buffer; and the device further comprises reception means for receiving packets from a network; wherein the reception means uses the jitter buffer to average out variations in inter-arrival duration of the packets being received so that the snippets of the received packets are played out at a uniform rate;
means for dropping a snippet if a current size of the jitter buffer is larger than a maximum size.

27. A device comprising:
first means for forming a first packet containing information to be played out over a first length of time in real time; and
second means, responsive to a predetermined event, for forming a second packet containing information to be played out over a second length of time in real time; the second length of time being longer than the first length of time;
third means for switchably connecting the first means and the second means to a common input source.

28. The device of claim 25 or 26 further comprising:
means for transmitting the packets, wherein:
the first packet belongs to an existing stream transmitted by the device; and
the second packet belongs to a new stream to be transmitted by the device.

29. The device of claim 25 or 26 further comprising:
means for transmitting the packets, wherein:
the first packet belongs to an existing stream transmitted by the device; and
the second packet belongs to said existing stream.

30. A device comprising:
first means for forming a first packet containing information to be played out over a first length of time in real time; and
second means, responsive to a predetermined event, for forming a second packet containing information to be played out over a second length of time in real time, the second length of time being longer than the first length of time; and
a third means for switchably connecting the first means and the second means to a common input source; and wherein
the predetermined event includes an increase beyond a predetermined threshold of processing requirements in another device that receives the first packet and the second packet.

31. A device comprising:
first means for forming a first packet containing information to be played out over a first length of time in real time; and
second means, responsive to a predetermined event, for forming a second packet containing information to be played out over a second length of time in real time, the second length of time being longer than the first length of time; and
a third means for switchably connecting the first means and the second means to a common input source; and wherein:
the predetermined event includes an increase beyond a predetermined threshold of processing requirements in said device.

* * * * *

UNITED STATES PATENT AND TRADEMARK OFFICE
CERTIFICATE OF CORRECTION

| | | |
|---|---|---|
| PATENT NO. | : 6,996,059 B1 | Page 1 of 1 |
| APPLICATION NO. | : 09/314593 | |
| DATED | : February 7, 2006 | |
| INVENTOR(S) | : Dale C. Tonogai | |

It is certified that error appears in the above-identified patent and that said Letters Patent is hereby corrected as shown below:

In column 33 delete claim 4

In column 33 delete claim 5

In column 35, line 22, after number; please insert --and--

In column 35, line 57, after requirements; please insert --and--

In column 35, line 59, after network; please insert --and--

In column 36, line 6, after requirements; please insert --and--

In column 36, line 8, after network; please insert --and--

In column 36 delete claim 27

In column 36, line 47, after wherein please insert --(:)--

Signed and Sealed this
Third Day of July, 2012

David J. Kappos
*Director of the United States Patent and Trademark Office*